(12) United States Patent
Vadipour

(10) Patent No.: US 11,912,178 B2
(45) Date of Patent: Feb. 27, 2024

(54) SYSTEM FOR TRANSFORMING THE INTERIOR OF A VEHICLE INTO A SLEEPING OR LOAD SPACE

(71) Applicant: Morteza Vadipour, Woodland Hills, CA (US)

(72) Inventor: Morteza Vadipour, Woodland Hills, CA (US)

( * ) Notice: Subject to any disclaimer, the term of this patent is extended or adjusted under 35 U.S.C. 154(b) by 0 days.

(21) Appl. No.: 18/312,025

(22) Filed: May 4, 2023

(65) Prior Publication Data

US 2023/0406172 A1 Dec. 21, 2023

Related U.S. Application Data

(60) Provisional application No. 63/376,444, filed on Sep. 21, 2022, provisional application No. 63/366,560, filed on Jun. 17, 2022.

(51) Int. Cl.
*A47C 1/032* (2006.01)
*A47C 1/02* (2006.01)
*B60N 2/34* (2006.01)
*B60N 2/30* (2006.01)

(52) U.S. Cl.
CPC ............. *B60N 2/34* (2013.01); *B60N 2/3081* (2013.01)

(58) Field of Classification Search
CPC ....... B60N 2/34; B60N 2/3084; B60N 2/3081
See application file for complete search history.

(56) References Cited

U.S. PATENT DOCUMENTS

| 1,023,275 | A | | 4/1912 | Rogers | |
|---|---|---|---|---|---|
| 1,612,161 | A | | 12/1926 | Speegle | |
| 3,193,324 | A | * | 7/1965 | Stock | B60N 2/36 297/83 |
| 3,964,785 | A | * | 6/1976 | Plume | A47C 17/34 5/47 |
| 4,065,174 | A | * | 12/1977 | Yokohama | B60N 2/32 297/66 |

(Continued)

FOREIGN PATENT DOCUMENTS

| CN | 101357604 A | 2/2009 |
|---|---|---|
| CN | 202764735 U | 3/2013 |

(Continued)

OTHER PUBLICATIONS

International Search Report and Written Opinion issued in App. No. PCT/US2023/067083, dated Aug. 30, 2023, 6 pages.

*Primary Examiner* — Shin H Kim
(74) *Attorney, Agent, or Firm* — KOS IP Law LLP

(57) ABSTRACT

A system, mechanisms, and components for converting the interior of a vehicle into a sleeping space is disclosed. The vehicle may have front seats with modular back supports that can transform to reduce the seat height so that the back support can recline horizontally backwards and lay flat with the bottom support of the rear seat. The modular back support may have an upper section and a lower section, where the upper section may fold or retract inside the lower section. Additionally, the headrest of the front seat may also retract inside the modular back support to reduce the seat height. The mid-section of the vehicle where the center console and armrest are located may also transform to create a continuous flat surface inside the vehicle.

20 Claims, 20 Drawing Sheets

(56) References Cited

U.S. PATENT DOCUMENTS

| | | | |
|---|---|---|---|
| 4,085,962 A * | 4/1978 | Wahls | B60N 2/34 297/65 |
| 4,470,629 A | 9/1984 | Collins, Jr. | |
| 5,458,396 A | 10/1995 | Rost | |
| 5,516,194 A * | 5/1996 | Maule | B60N 2/345 297/238 |
| 5,691,695 A | 11/1997 | Lahiff | |
| 5,821,935 A | 10/1998 | Hartman | |
| 6,192,565 B1 | 2/2001 | Tame | |
| 7,134,727 B2 * | 11/2006 | Williams | A47C 17/04 297/411.3 |
| 9,738,185 B1 * | 8/2017 | Guygaew | B60N 2/34 |
| 10,065,535 B1 | 9/2018 | Line | |
| 10,081,270 B1 | 9/2018 | Line | |
| 10,144,330 B1 | 12/2018 | Leck | |
| 10,144,383 B2 | 12/2018 | Bodtker | |
| 10,315,772 B2 | 6/2019 | Ehrmann | |
| 10,351,022 B1 | 7/2019 | Dry | |
| 11,299,278 B1 * | 4/2022 | Malecha | B60N 2/34 |
| 2011/0175411 A1 | 7/2011 | Wagner | |
| 2012/0205934 A1 * | 8/2012 | Fletcher | B60N 2/36 296/69 |
| 2014/0062891 A1 | 3/2014 | Powell | |
| 2019/0047445 A1 * | 2/2019 | Kim | B60N 3/002 |
| 2022/0001912 A1 | 1/2022 | Mayville | |

FOREIGN PATENT DOCUMENTS

| | | |
|---|---|---|
| CN | 205997739 U | 3/2017 |
| CN | 208730827 U | 4/2019 |
| CN | 110682835 A | 1/2020 |
| CN | 211280731 U | 8/2020 |
| CN | 214775486 U | 11/2021 |
| DE | 102012014326 A1 | 4/2014 |
| EP | 0999770 A1 | 5/2000 |
| GB | 2350787 A | 12/2000 |
| JP | 04087531 U | 7/1992 |
| JP | 2012025222 A | 2/2012 |
| JP | 2019142294 A | 8/2019 |
| KR | 19990012940 A | 2/1999 |
| KR | 100851863 B1 | 8/2008 |
| KR | 102114456 B1 | 5/2020 |
| WO | 2020011537 A1 | 1/2020 |
| WO | 2021010780 A1 | 1/2021 |

* cited by examiner

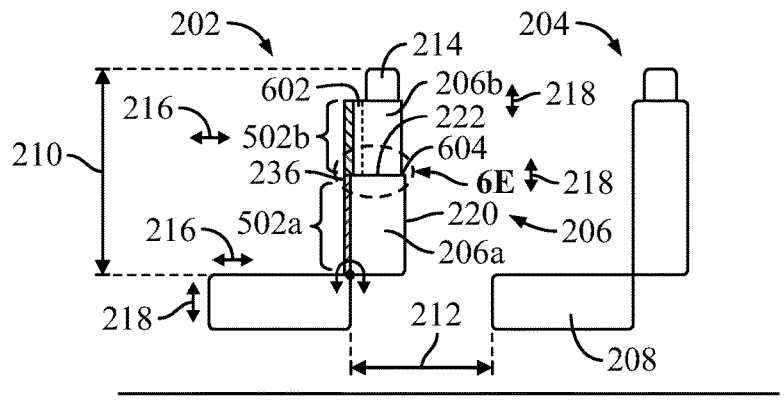
FIG. 6A
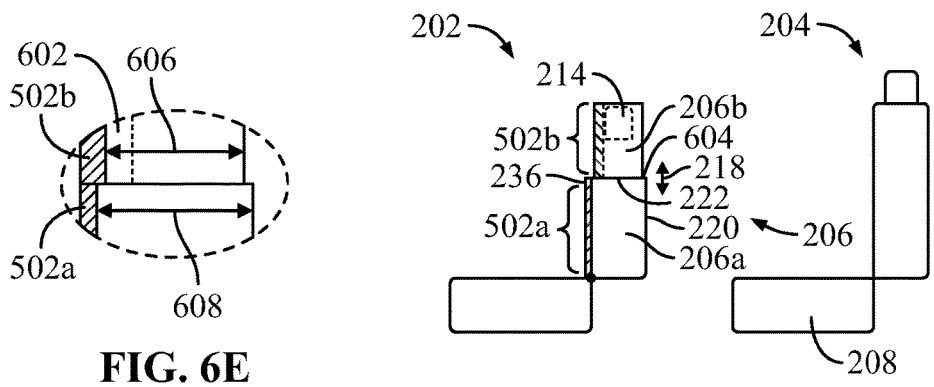
FIG. 6E
FIG. 6B
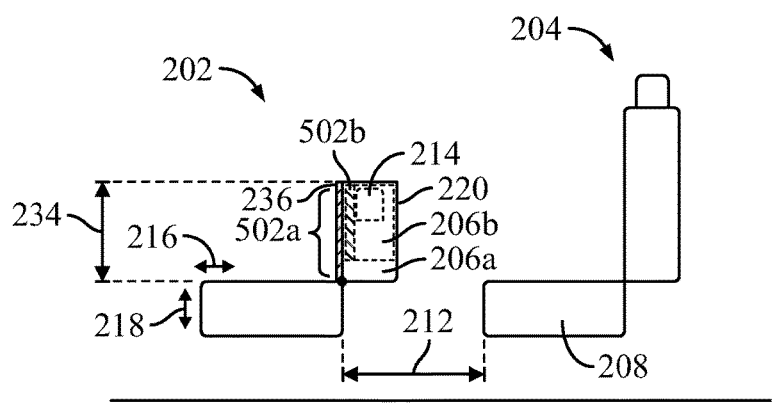
FIG. 6C
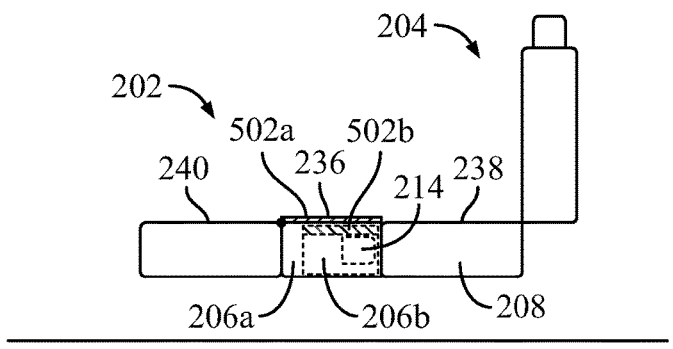
FIG. 6D

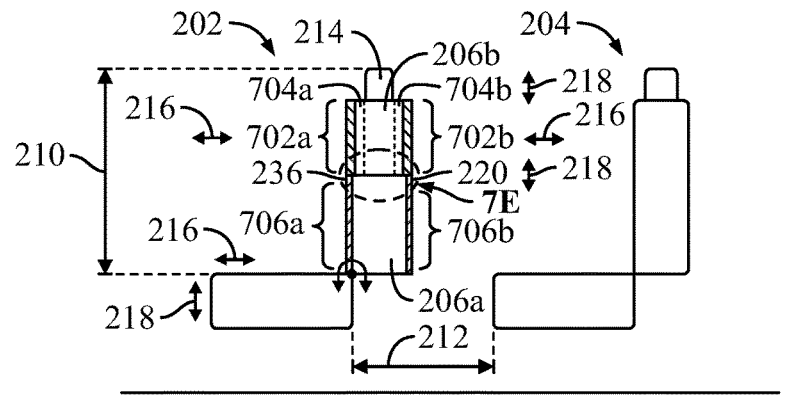
FIG. 7A
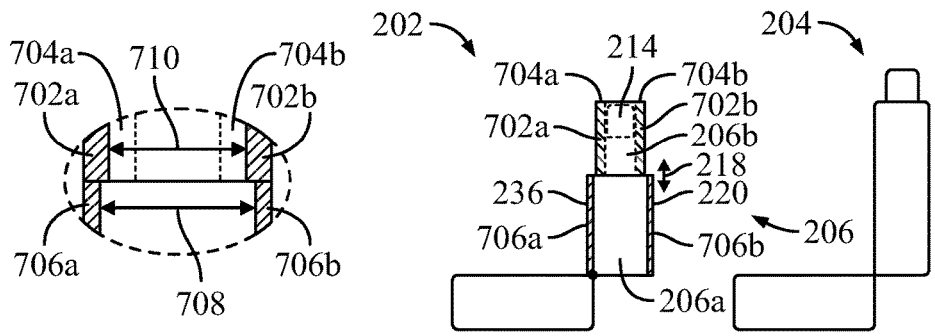
FIG. 7B
FIG. 7E
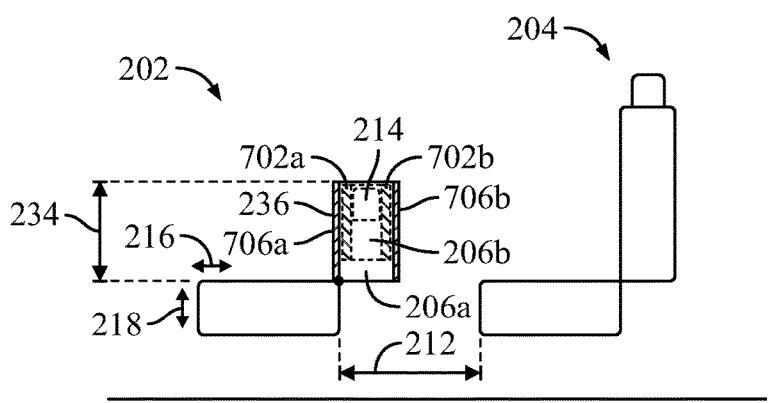
FIG. 7C
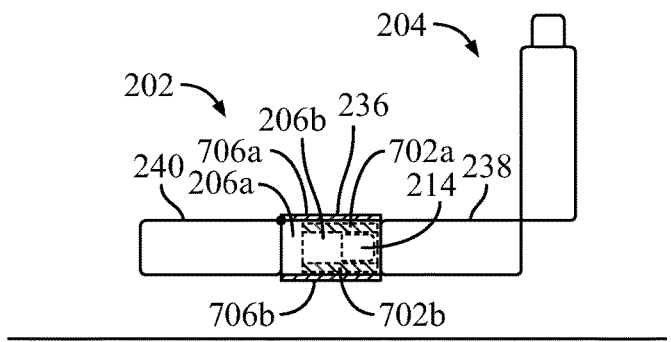
FIG. 7D

SYSTEM FOR TRANSFORMING THE INTERIOR OF A VEHICLE INTO A SLEEPING OR LOAD SPACE

CROSS-REFERENCE TO RELATED APPLICATIONS

The present application claims the benefit of U.S. Prov. Pat. App. Ser. No. 63/366,560, filed on 2022 Jun. 17, and U.S. Prov. Pat. App. Ser. No. 63/376,444, filed on 2022 Sep. 21, the entire contents of which are expressly incorporated herein by reference.

STATEMENT RE: FEDERALLY SPONSORED RESEARCH/DEVELOPMENT

Not Applicable

BACKGROUND

The various embodiments and aspects described herein relate to a system, mechanisms, and components for transforming the interior of a vehicle into a sleeping space, mainly by fully reclining the front seats of the vehicle into a substantially flat position.

A vehicle such as a car, truck, or an SUV is mainly designed for the driver and the passengers to sit inside and travel to their desired destination. Although most vehicles provide a reclining seat option for the front driver and passenger seats, very few provide the option of sleeping. Such transformation may be necessary if the users of the vehicle would like to convert the interior of the vehicle into a sleeping space with a spacious and substantially flat space for them to lie on. Additionally, the few vehicles that provide the option of reconfiguring the front seats for sleeping have various other issues.

Accordingly, there is a need in the art for an improved device, system, and method for converting the interior of a vehicle into a sleeping space.

BRIEF SUMMARY

The various embodiments and aspects disclosed herein address the needs discussed above, discussed below and those that are known in the art.

A system, mechanisms, and components for converting the interior of a vehicle into a sleeping space is disclosed. The vehicle may have front seats with modular back supports that can retract and reduce the seat height so that the back support can recline horizontally backwards and lay flat with the bottom support of the rear seat. The modular back support may have an upper section and a lower section, where the upper section may retract inside the lower section. The upper modular section may have a narrower thickness than the lower modular section or may be transformed to have a narrower thickness. As a result, the upper modular section may retract inside the lower modular section via a telescoping mechanism. Alternatively, the modular back support may be folded to reduce the seat height. The headrest of the front seat may also retract inside the modular back support to reduce the seat height. The mid-section of the vehicle where the center console and armrest are located may also transform to create a continuous flat surface inside the vehicle. As a result, a user may flatten the seats and the mid-section of the vehicle to create a flat surface to lay horizontally or diagonally in the interior of the vehicle.

In an aspect, a method for transforming seats of a vehicle into a sleeping space is disclosed. The method may comprise the steps of folding an upper modular support backward around a hinge behind a lower modular support to reduce a combined overall height of a back support which is comprised of the upper modular support and the lower modular support; widening a gap distance between the front passenger seat and a rear passenger seat for the gap distance to be greater than or equal to a desired height of the back support; and reclining the back support to a horizontal position about the hinge between the front passenger seat and the rear passenger seat so that a supporting surface of the front passenger seat is level to a sitting surface of the rear passenger seat. In the method, the reclining step may be performed by folding.

BRIEF DESCRIPTION OF THE DRAWINGS

These and other features and advantages of the various embodiments disclosed herein will be better understood with respect to the following description and drawings, in which like numbers refer to like parts throughout, and in which:

FIGS. 6A-E are side view diagrams of another embodiment where the front seat transforms into a substantially flat position;

FIGS. 7A-E are side view diagrams of another embodiment where the front seat transforms into a substantially flat position;

DETAILED DESCRIPTION

Figure 1A:
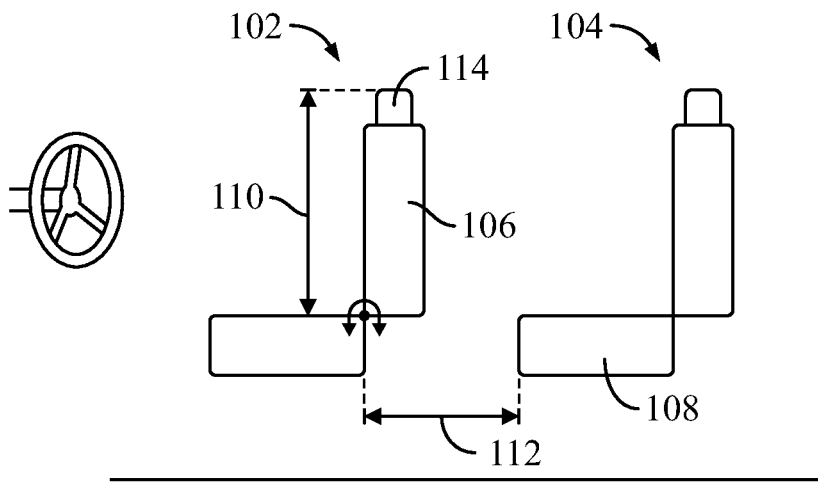
FIGS. 1A-B are side view diagrams of the front and rear seats of an ordinary car transforming to a reclined position.
Figure 1B:
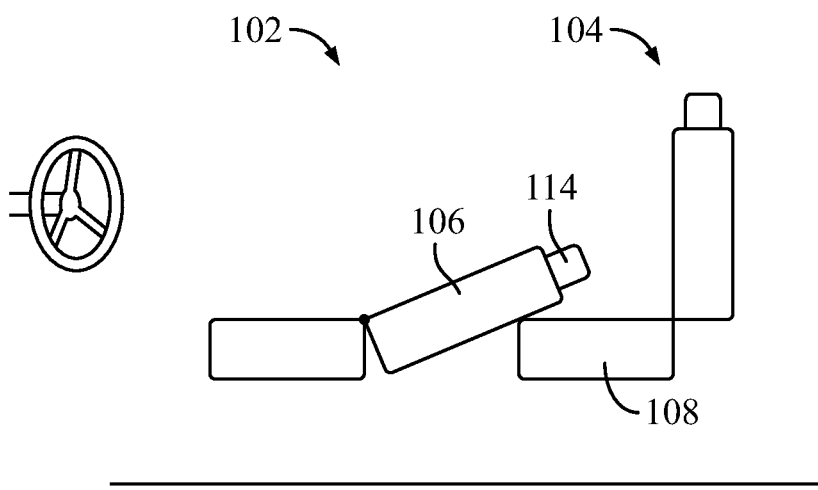
Figure 11A:
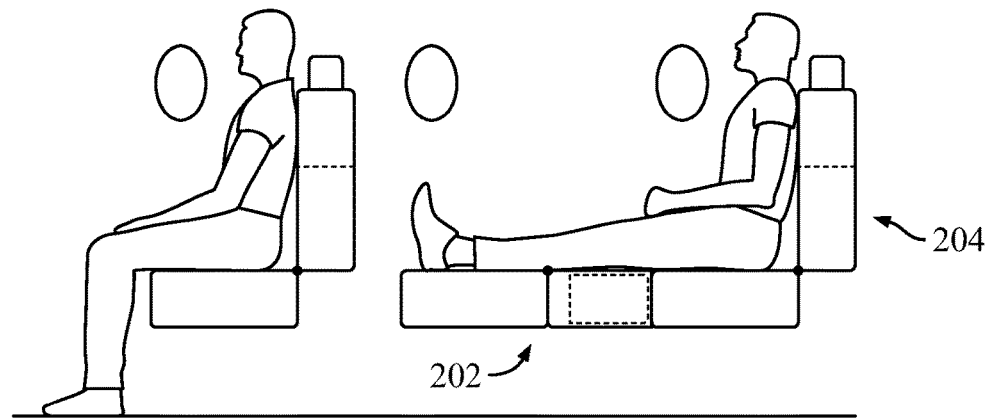
FIGS. 11A-C are side view diagrams of the seat transformation being used for airplane seats.
Figure 11B:
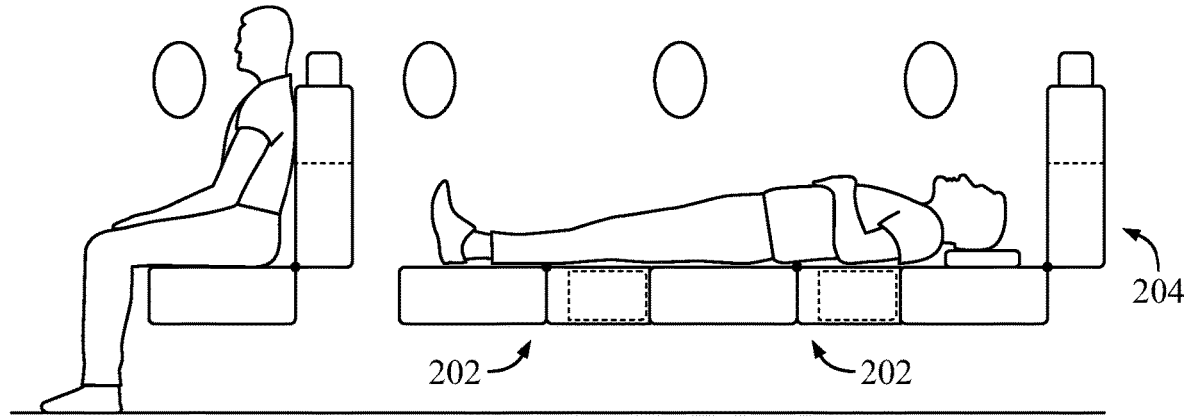
Figure 11C:
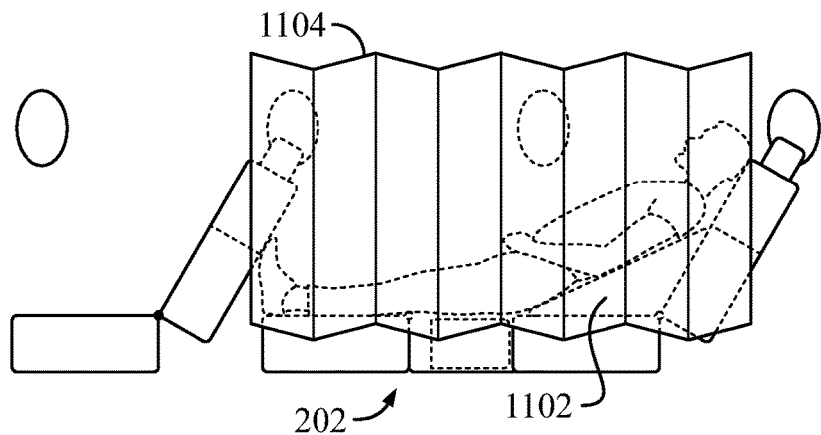
Figure 12:
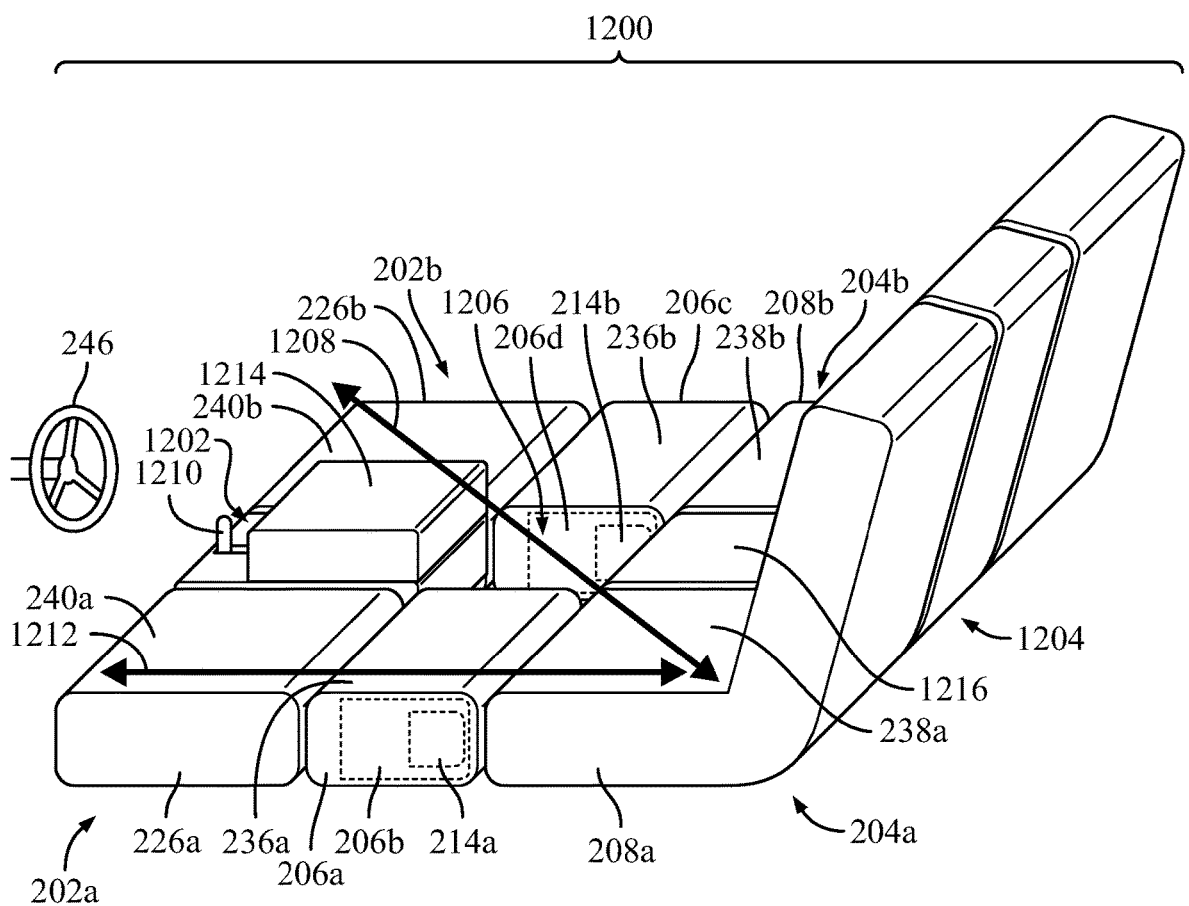
FIG. 12 is a perspective view of an interior of the vehicle transformed in a substantially flat and continuous sleeping area.
Figure 17:
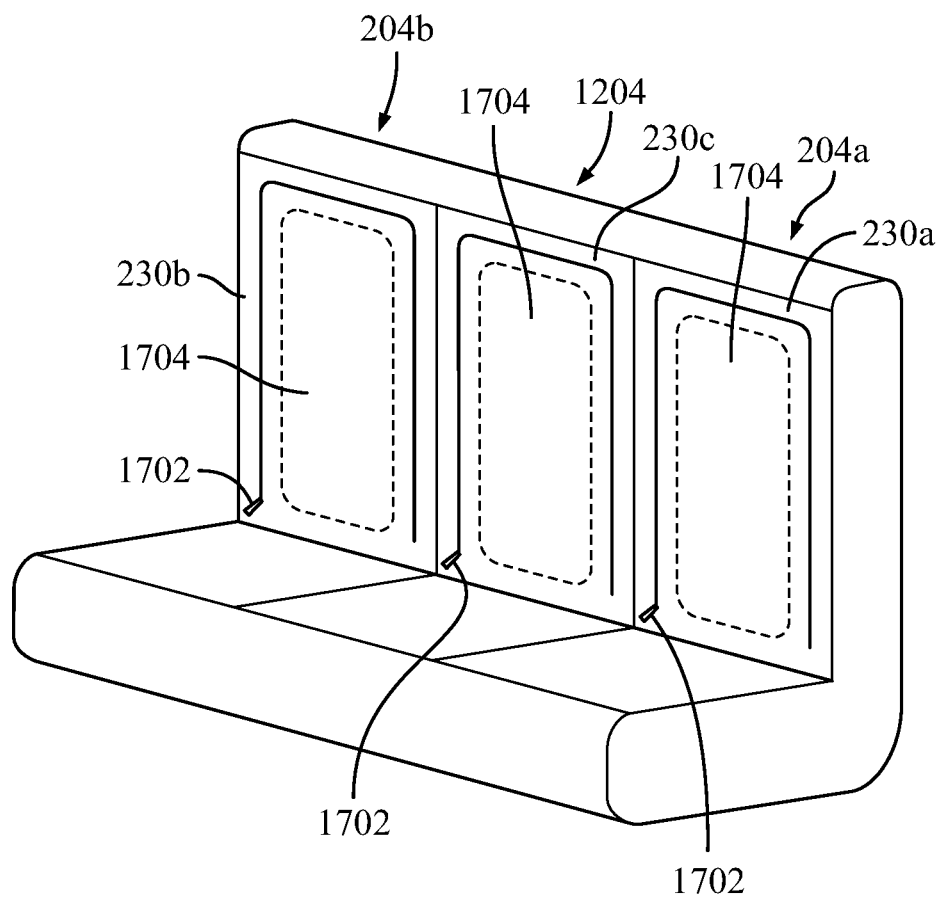
FIG. 17 is a perspective view of the rear seats of a vehicle having a storage area for sleeping accessories.
Figure 18:
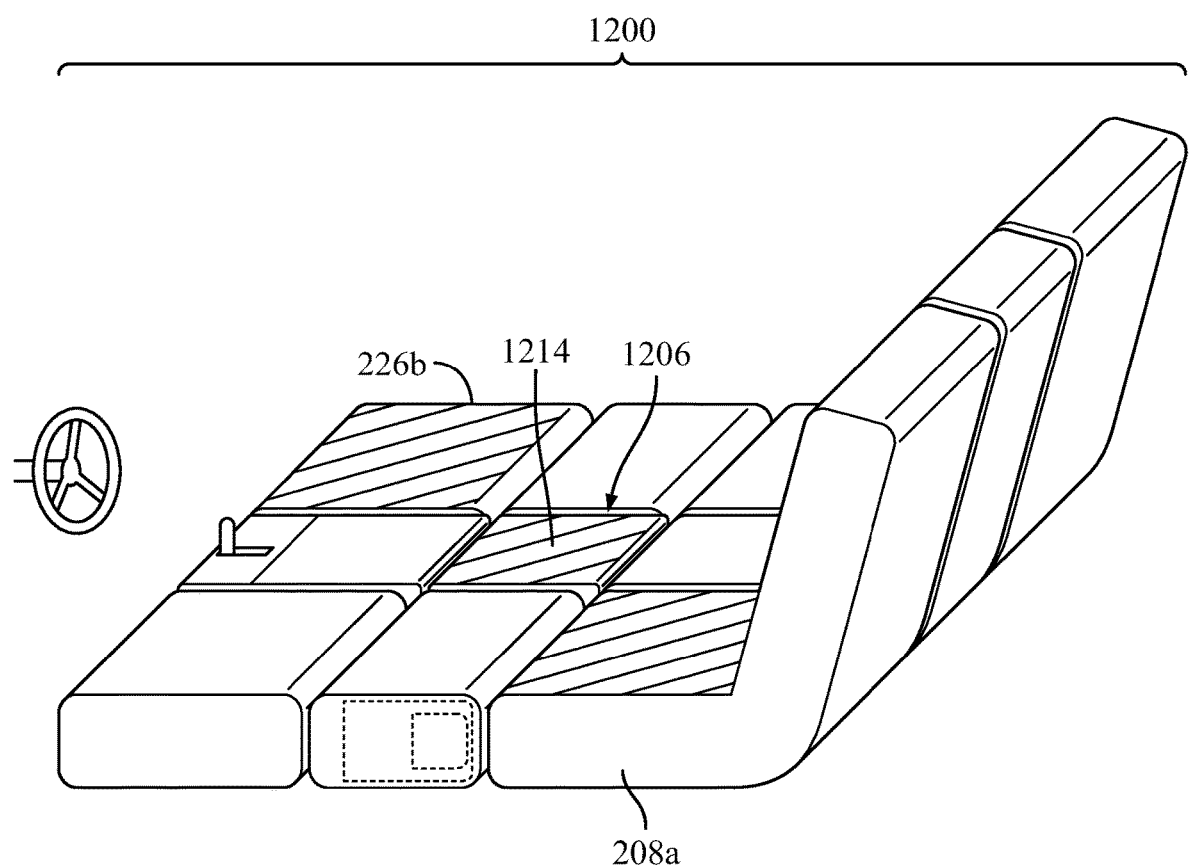
FIG. 18 is a perspective view of the substantially flat sleeping area of the vehicle having surfaces with additional features.
Figure 19:
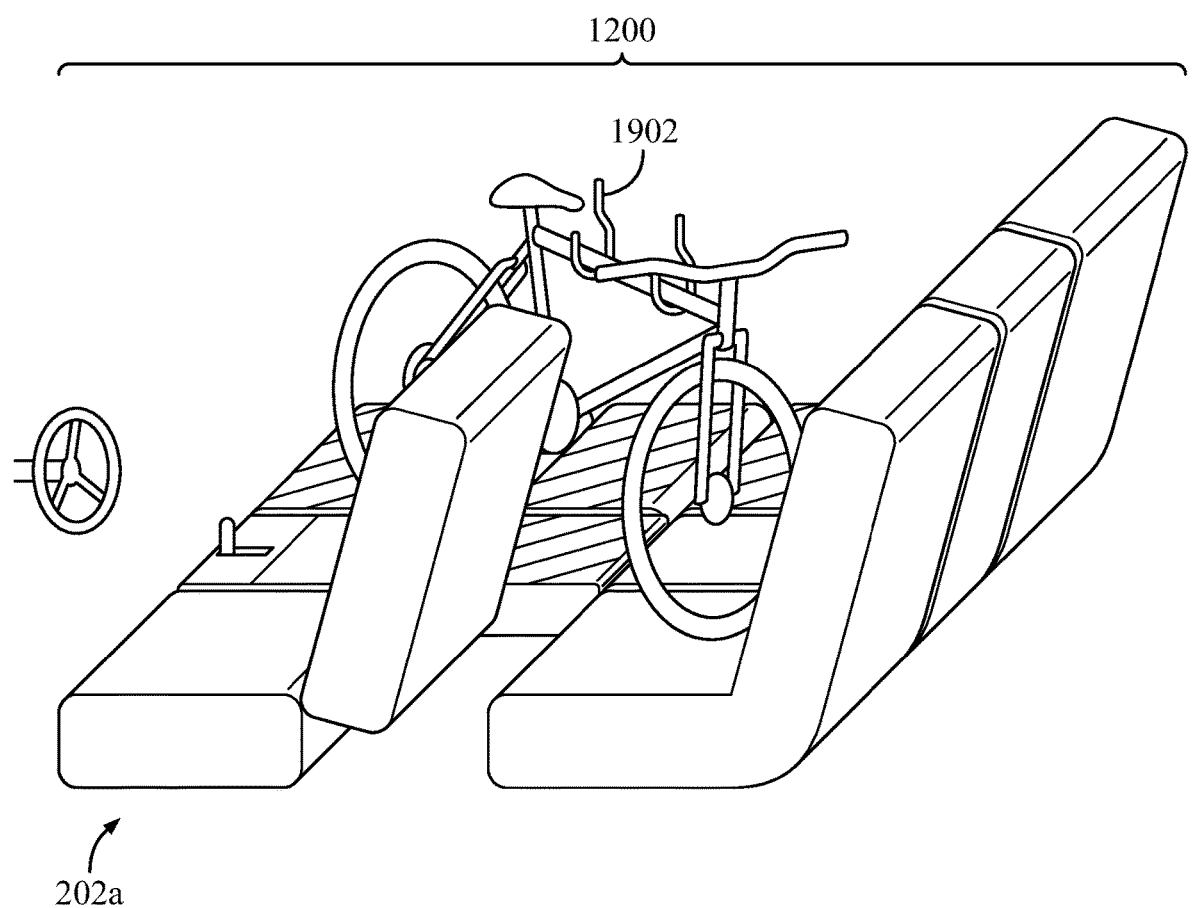
FIG. 19 is a perspective view of the substantially flat interior area of the vehicle having room to store objects.

Referring now to the figures, a system, mechanisms, and components for converting the interior of a vehicle into a sleeping space is disclosed. The problem with ordinary seats of a vehicle is shown in FIGS. 1A-B, where the back support 106 of the front seat 102 is rigid and cannot recline horizontally backward to create a flat surface with the bottom support 108 of a rear seat 104. FIGS. 2A-D show the general mechanism of fully reclining the front seat 202 backwards, where the back support 206 of the front seat 202 has modular components. The upper modular section 206*b* of the back support 206 may retract inside the lower modular section 206*a* to reduce the seat height 210 in order for the back support 206 to fit inside the gap distance 212 between the front seat 202 and the rear seat 204. Additionally, the front headrest 214 may also retract inside the back support 206. FIGS. 3-7 show different embodiments of how the upper modular support 206*b* and the front headrest 214 of the front seat 202 may be adjusted to change the seat height 210 to a desired height 234. Furthermore, FIGS. 8-9 show folding mechanisms between the front headrest 214, upper modular support 206*b*, and the lower modular support 206*a* for changing the height of the front seat 202, and FIG. 10 shows a manual removal mechanism of the headrest 214 and the upper modular section 206*b*. FIG. 11 shows the seat transformation applied to other transportation vehicles, such as an airplane. The interior of the car 1200 with both front seats 202*a, b* flattened to create a substantially flat, continuous, and spacious surface for one or more users to lie on is shown in FIG. 12. FIGS. 13-16 show how the middle section 1202 of the vehicle interior 1200 may be substantially flattened by translating the armrest 1214 and covering the leg space gap 1206 of the rear middle seat 1204. Other miscellaneous features of the seats and the interior of the vehicle 1200 are shown in FIGS. 17-19.

More particularly, referring now to FIGS. 1A-B, side view diagrams of the front and rear seats of an ordinary car in a sitting and reclined position is shown. In an ordinary vehicle, the back support 106 of a front seat 102 may not fully recline back and lay flush with the bottom support 108 of the rear seat 104, as seen in FIG. 1B. This may be due to the height 110 of the front seat 102 being greater than the gap 112 between the front seat 102 and the rear seat 104, as seen in FIG. 1A. Since the front back support 106 and headrest 114 of an ordinary vehicle are rigid and have limited mobility, the front seat 102 cannot fully recline to create a continuous flat surface along the front seat 102 and the rear seat 104 of the vehicle.

Referring now to the rest of the figures, the components and mechanisms of the front seat 202 described herein may apply to both the driver seat and the front passenger seat of the vehicle, specifically a car. A front vehicle seat 202 may be closer to the steering wheel 246 and the front windshield of the vehicle when compared to the rear vehicle seat 204. Furthermore, the rear passenger seats of the vehicle, represented by rear seat 204, may have the same components and features as described herein for the front seat 202. Additionally, the steering wheel 246 of FIGS. 2A-D are omitted in the other figures, but the relative positions of the front seat 202 and the rear seat 204 inside the vehicle does not change.

The components and mechanisms described herein to transform the front seat 202 into the substantially flat position may also be used to revert back the front seat 202 to its original position.

Figure 2A:
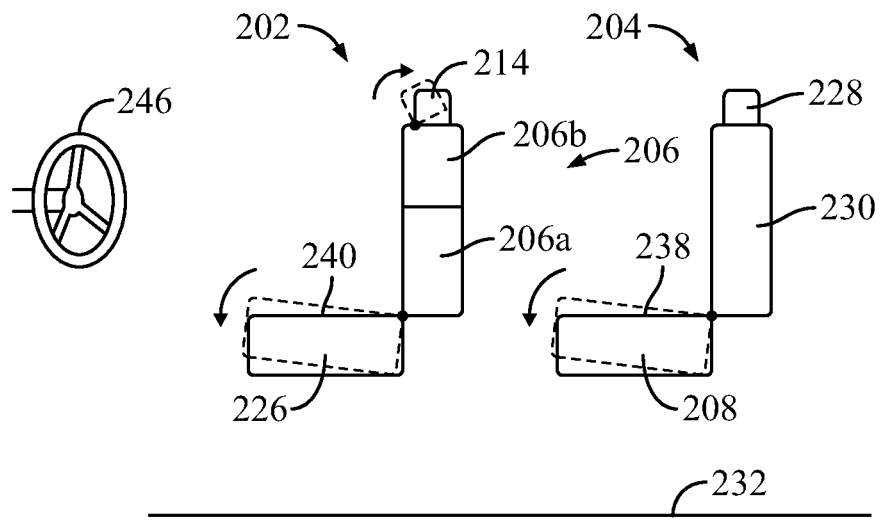
FIGS. 2A-D are side view diagrams of the front and rear seats of a car where the front seat transforms into a substantially flat surface with the bottom support of the rear seat.

Referring now to FIGS. 2A-D, side view diagrams of the front 202 and rear seats 204 of a car is shown, where the front seat 202 transforms into a substantially flat surface to align and lay flush with the rear bottom support 208 of the rear seat 204. Prior to transforming the front seat 202, and as shown in FIG. 2A, the front bottom support 226 and the rear bottom support 208 may be flattened horizontally if such components are initially at sloped positions. Similarly, the front headrest 214 may be straightened vertically if initially at an angled position.

Figure 2B:
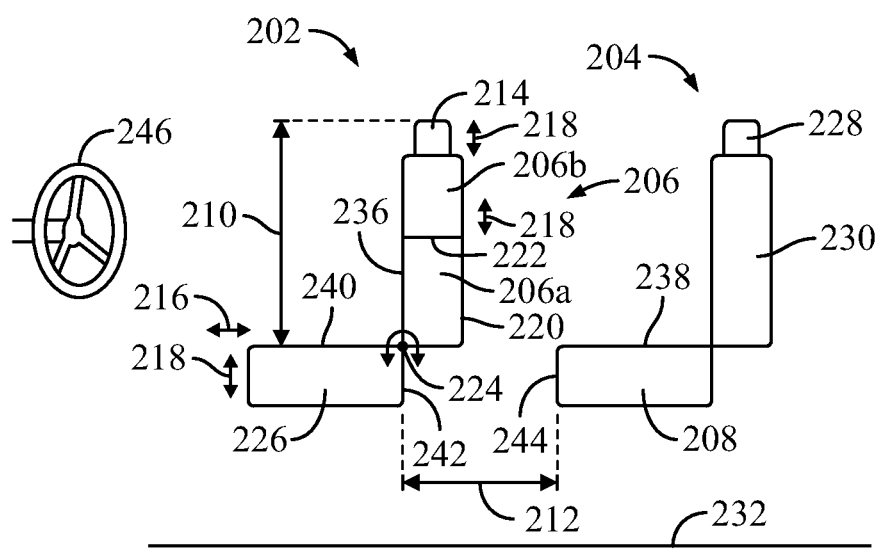
Figure 2C:
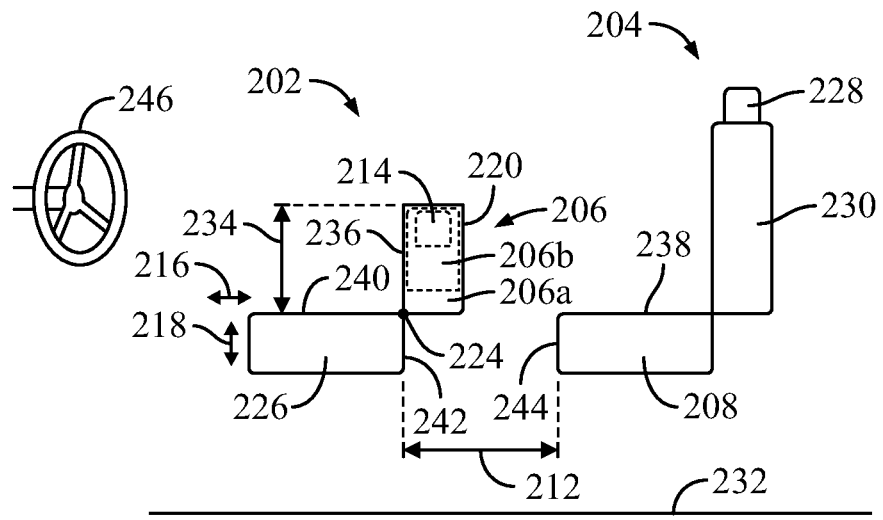
Figure 2D:
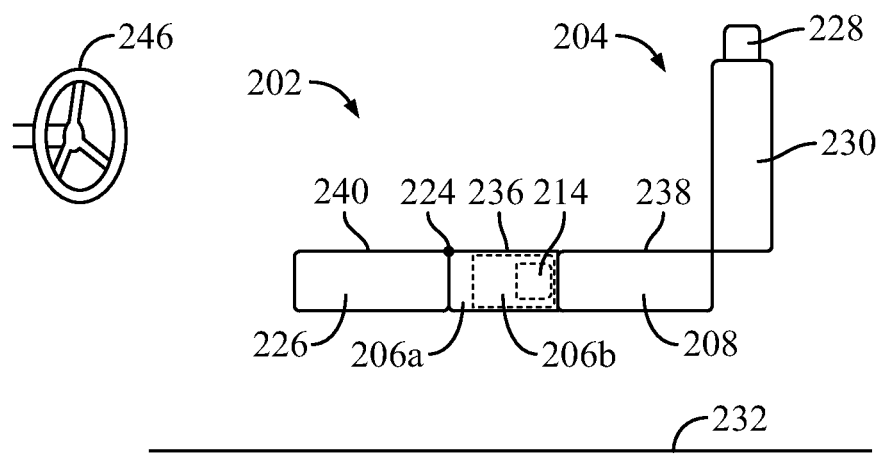

With further reference to FIG. 2B, the front vehicle seat 202 may have a movable front headrest 214 attached on top of a modular back support 206 attached and pivotable to a front bottom support 226. Similarly, the rear vehicle seat 204 may have a rear headrest 228 attached on top of a rear back support 230 that is attached to a rear bottom support 208. As shown in FIG. 2D, the modular back support 206 may be configured to recline backwards between 60 to 120 degrees and more particularly by 90 degrees, from a position orthogonal to the front bottom support 226 (shown in FIG. 2B), so that the supporting surface 236 of the front seat 202 lays substantially flush with the rear sitting surface 238 of the rear seat 204, and also with the front sitting surface 240 of the front seat 202. The modular back support 206 may be rotated backwards to any degree to allow the supporting surface 236 of the front seat 202 to lay substantially flush with the rear sitting surface 238. This may be done by transforming the front seat 202 so that the seat height 210 (shown in FIG. 2B) decreases to a distance less than or equal to the gap distance 212 between the front seat 202 and the rear seat 204. The seat height 210 may be measured from the top of the front headrest 214 to the bottom edge of the modular back support 206, which may be at the same level as the front sitting surface 240. Alternatively, the seat height 210 may be measured from the top edge of the modular back support 206 to its bottom edge. The gap distance 212 may be measured from the rear edge 242 of the front bottom support 226 to the front edge 244 of the rear bottom support 238. Alternatively, the gap distance 212 may be measured from the back surface 220 of the modular back support 206 to the front edge 244 of the second bottom support 238.

The front headrest 214 may be configured to automatically or manually change positions to move inside the modular back support 206 in order to shorten the seat height 210 for reclining. By way of example and not limitation, the headrest 214 may move inside the modular back support 206 via the vertical direction 218, as seen in FIG. 2C. More specifically, the upper modular support 206*b* of the back support 206 may have a cavity for the front headrest 214 to fit inside. As described elsewhere herein, the translation of the front headrest 214 inside the upper modular support 206*b* may be done through a telescoping mechanism where the thickness of the headrest 214 is less than the thickness of the upper modular support 206*b*. The translation of the front headrest 214 inside the modular back support 206 may be done manually through a mechanical mechanism or via an automated electromechanical mechanism that automatically moves the front headrest 214 inside the modular back support 206. Additionally, the front headrest 214 may not necessarily be centered above the modular back support 206 and may alternatively be positioned more near to the supporting surface 236. The aforementioned features may also apply to the rest of the embodiments disclosed elsewhere herein.

The modular back support 206 may also be configured to shorten in length to reduce the seat height 210 to a second height 234 (shown in FIG. 2C) for reclining and fitting within the gap distance 212, as shown in FIG. 2D. The modular back support 206 may have an upper modular section 206b and a lower modular section 206a, where the upper section 206b may be automatically or manually translated inside the lower section 206a via vertical direction 218, as shown in FIG. 2C. The front headrest 214 may also move inside of the lower modular support 206a. The lower modular section 206a may have a cavity for the upper modular section 206b and the front headrest 214 to fit inside. As shown in FIG. 2C, the headrest 214 may fit within the upper modular section 206b that in-turn fits within the lower modular section 206a. As described elsewhere herein, the translation of the upper section 206b inside the lower section 206a may be done through a telescoping mechanism where the thickness of the upper section 206b is less than the thickness of the lower section 206a. The translation of the upper section 206b inside the lower section 206a may be done by a manually operated mechanical mechanism or via an automated electromechanical mechanism that automatically moves the upper section 206b inside the lower section 206a. The aforementioned transformation mechanisms may also apply to the rest of the embodiments disclosed elsewhere herein.

By way of example and not limitation, the height of the upper modular support 206b may be between one-tenth to being equal to the height of the lower modular support 206a. The height of the upper modular support 206b may depend on how short the seat height 210 needs to be shortened by the upper modular support 206b fitting inside the lower modular support 206a. As a result, the borderline 222 between the support modules 206a, b may be higher or lower than what is shown in the figures. Since the supporting surface 236 is likely to have a cushioning surface, as disclosed elsewhere herein, a person using the modular back support 206 may not feel the discontinuity that may be created by the modularity of the lower and upper modular supports 206a, b along the borderline 222.

When the seat height 210 (shown in FIG. 2B) is adjusted to the desired height 234 (shown in FIG. 2C) through the adjustment of the modular components and the headrest, the back support 206 may be reclined backwards about the pivot axis of the pivoting mechanism 224 to create a substantially flat, flush, and continuous surface between the front seat 202 and the rear seat 204, as shown in FIG. 2D. The pivoting mechanism 224 may have an axis of rotation parallel to the width of the front seat 202 and located at the contact point between the back support 206 and the front bottom support 226. By way of example and not limitation, the pivot point 224 may allow the back support 206 to recline backwards in a clockwise position all the way up to 90 to 100 degrees relative to the vertical position of the modular back support 206 shown in FIG. 2B. The modular back support 206 may also recline forward in the counterclockwise position all the way up to 90 degrees relative to the aforementioned position.

After reclining the back support 206 backwards in the substantially flat position, or prior to the reclining, the horizontal position of the front seat 202 relative to the rear seat 204 may need to be adjusted for the back support 206 to fit inside the gap distance 212 and create a continuous, flat, and flush surface between the supporting surface 236 and the rear sitting surface 238, as shown in FIG. 2D. For example, after the back support 206 is reclined backwards in the horizontally flat position within the gap distance 212, the front seat 202 may be actuated to move horizontally 216 towards the front edge 244 of the rear seat 204 to create the continuous and flat surface between the supporting surface 236 and the rear sitting surface 238. In another example, prior to reclining the back support 206 in the horizontally flat position, the front seat 202 may be actuated to move away horizontally 216 from the rear seat 204 to widen the gap distance 212 to be greater or equal to the distance value of the desired height 234. This would allow for an easier pivoting of the modular back support 206 into the flat position since there would be more room for the back support 206 to pivot and lay flat. The latter horizontal adjustment method of the front seat 202 may not be needed for the modular back support 206 to lay flat inside the gap distance 212 since car seats have flexible cushioning that can be depressed when pushed against by the rear bottom support 208 of the rear seat 204. How the horizontal position of the front seat 202 should be adjusted depends on the transformation of the desired height 234 of the back support 206. If the desired height 234 is short enough for the back support 206 to recline horizontally and fit inside the gap distance 212, but does not completely fill the gap, then the front seat 202 and its back support 206 may need to move towards the rear seat 204 after the reclining of the back support 206 to create the continuous surface. Additionally, if the back support 206 does not fully fill in the gap distance 212, the upper modular support 206b may be drawn outwards from the lower modular support 206a to close the gap between the flattened front seat 202 and the rear seat 204. If the desired height 234 is too long for the back support 206 to fully recline in the gap distance 212 and create a flat and continuous surface, then the front seat 202 and its back support 206 may need to move away from the rear seat 204 prior to the reclining to create a wider gap for the back support 206 to recline and create a flat and continuous surface. When the modular back support 206 is transformed into the substantially flat position, then the gap distance 212 may be narrowed by moving the front seat 202 towards the rear seat 204 via the horizontal direction 216 to create a continuous surface.

The height of the front bottom support 226 may be raised or lowered relative to the interior floor 232 so that the front sitting surface 240 may be substantially flush with the reclined supporting surface 236 and the second sitting surface 238. This may be done by raising or lowering the first bottom support 226 via vertical direction 218. By way of example and not limitation, the raising and lowering of the front bottom support 226 may either merely change the level of the front bottom support 226 only or also raise and lower the level of the front seat 202 in general.

Figure 3A:
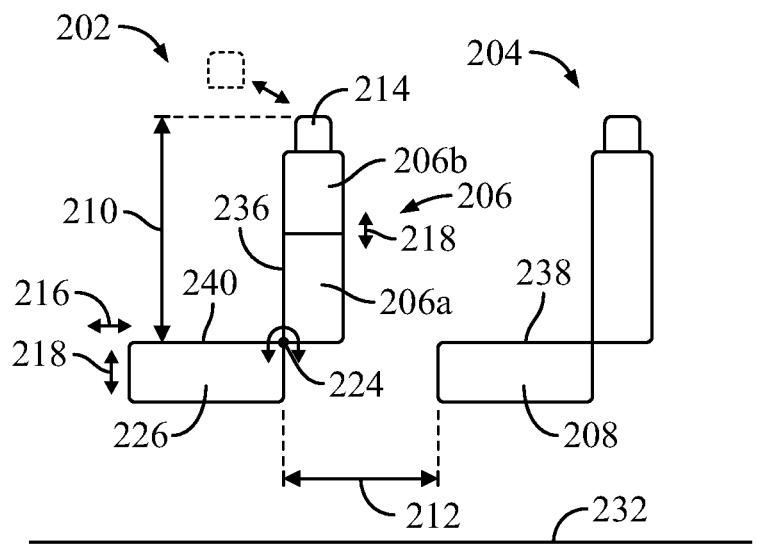
FIGS. 3A-C are side view diagrams of another embodiment where the front seat transforms into a substantially flat position.
Figure 3B:
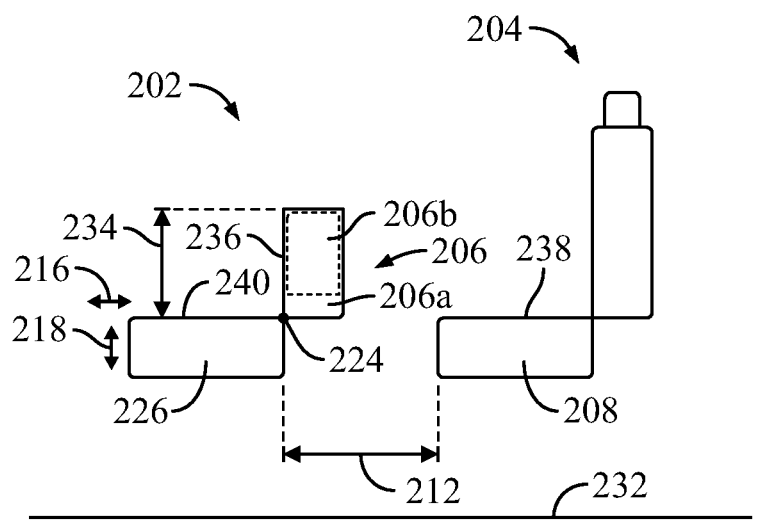
Figure 3C:
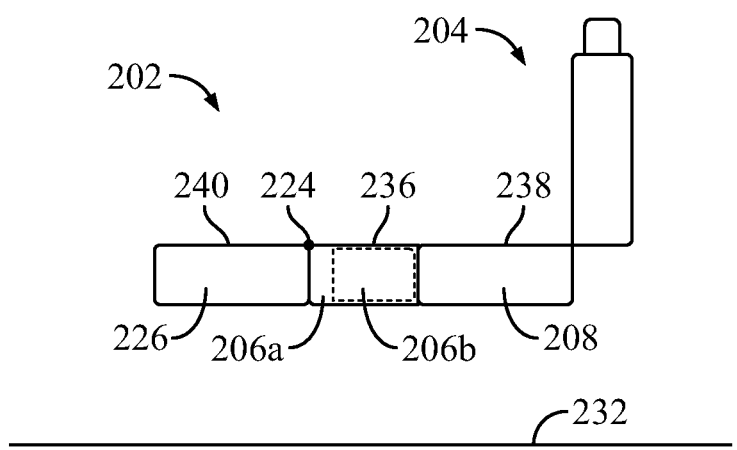

Referring now to FIGS. 3A-C, an alternative embodiment of the seat transformation is shown where the front headrest 214 may be manually detached from the front seat 202 instead of being translated inside the modular back support 206. As a result, the seat height 210 (shown in FIG. 3A) may be shortened in a hybrid manner where the front headrest 214 is manually detached from the front seat 202, and the upper modular section 206b is translated inside the lower modular section 206a either manually or automatically, as described elsewhere herein. The other components and features of the seating system of FIGS. 3A-C may be similar to what is disclosed elsewhere herein.

Referring now to FIGS. 4A-D, an alternative embodiment of the seat transformation is shown where the modular back support 206 has more than two modular sections 404a-c to shorten the seat height 210 to a desired height 234. The modular back support 206 may then be reclined backwards to create the substantially flat surface in the same way as described elsewhere herein. The modular back support 206 may be shortened by a telescoping mechanism where multiple modular supports 404a-c are retracted within each other.

Figure 4A:
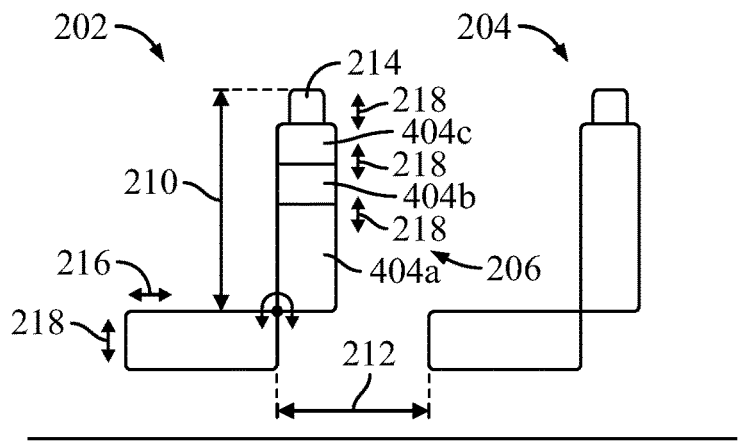
FIGS. 4A-D are side view diagrams of another embodiment where the front seat transforms into a substantially flat position.
Figure 4B:
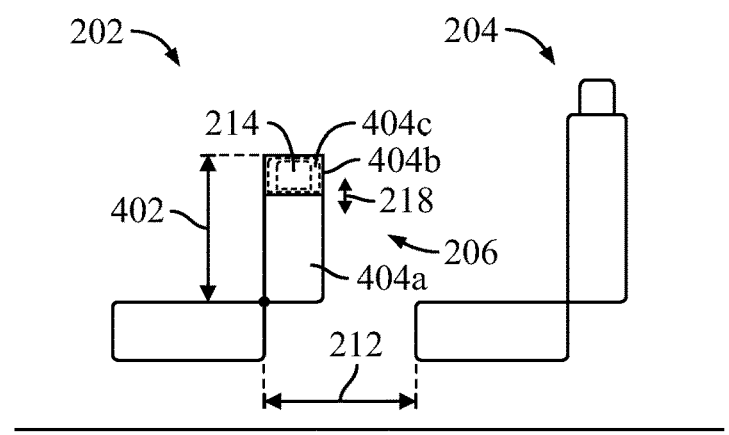
Figure 4C:
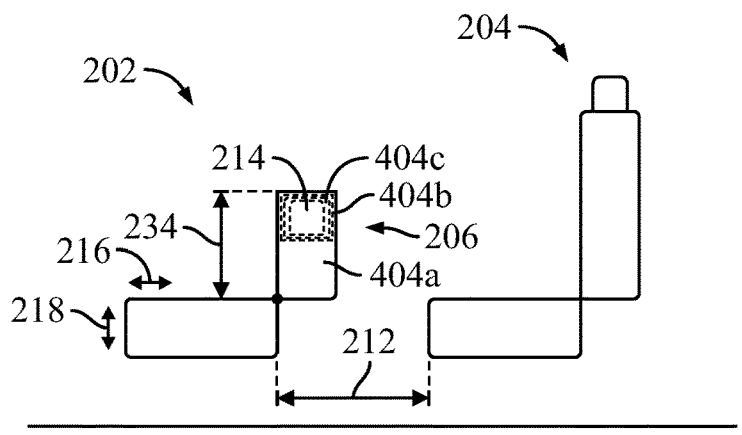
Figure 4D:
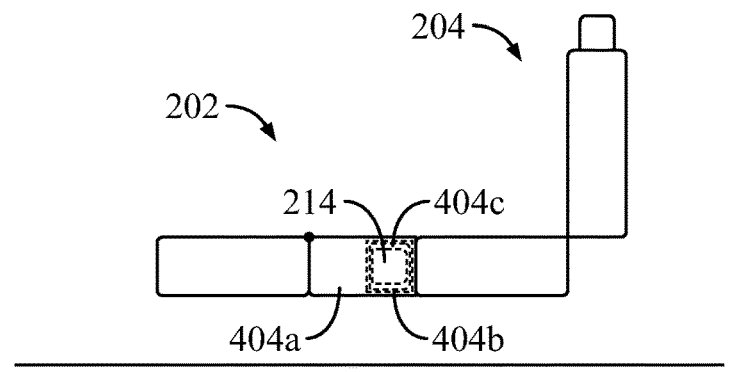

By way of example and not limitation, the telescoping mechanism may be possible by the modular sections 404a-c having different thicknesses than each other. For example, the top modular section 404c may have a thinner thickness than the intermediate modular section 404b so that the top section 404c may move downwards inside the intermediate section 404b via vertical direction 218, as shown in FIGS. 4A-B. The intermediate modular section 404b may then have a thinner thickness than the bottom modular section 404a so that the intermediate section 404b, having the top section 404c inside of it, may move downwards inside the bottom section 404a via vertical direction 218, as shown in FIGS. 4B-C. More description about the difference in thicknesses will be provided elsewhere herein. The front headrest 214 may also be retracted within the modular back support 206, as seen in FIGS. 4A-C, similar to what has been described elsewhere herein.

By way of example and not limitation, the height of the top modular section 404c and the intermediate modular section 404b may be approximately equal. Each height of the top and intermediate sections 404c, b may be between one-tenth to being equaling to the height of the bottom section 404a. The heights of the top and intermediate sections 404c, b, respectively, depend on how short the seat height 210 needs to be shortened. As a result, the borderlines between the modular support sections may be higher or lower than what is shown in the FIGS. 4A-D. More modular sections may also be added for more options of adjusting the front seat 202 height. By way of example and not limitation, there may be up to 12 modular sections making up the body of the back support 206.

The lowering of the plurality of modular sections 404a-c may be automated by an electromechanical mechanism or may be done manually using a mechanical mechanism. The front seat 202 may also be maintained at an intermediate height 402 (shown in FIG. 4B) with only the top modular section 404c and the front headrest 214 retracted inside the intermediate modular section 404b. The multiple modular components 404a-c of the modular back support 206 described herein with reference to FIGS. 4A-D may also be applied to other embodiments described elsewhere herein. The rest of the transformation mechanism of the front seat 202 into a substantially flat and continuous surface with the rear seat 204 may be the same as described elsewhere herein.

Figure 5A:
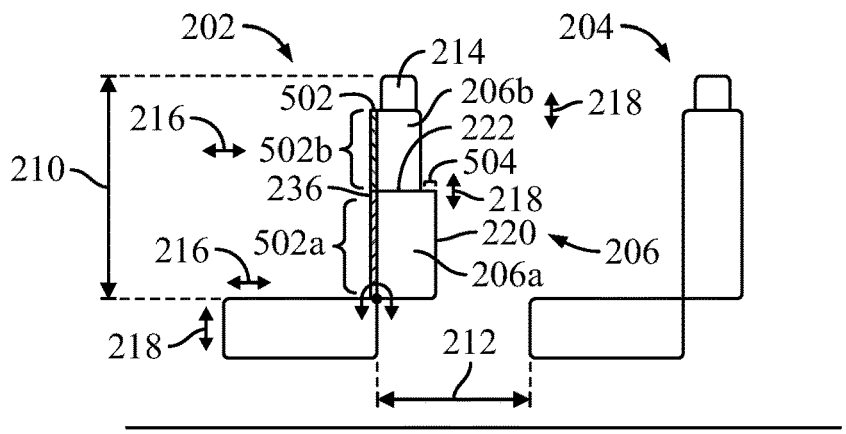
FIGS. 5A-D are side view diagrams of another embodiment where the front seat transforms into a substantially flat position.
Figure 5B:
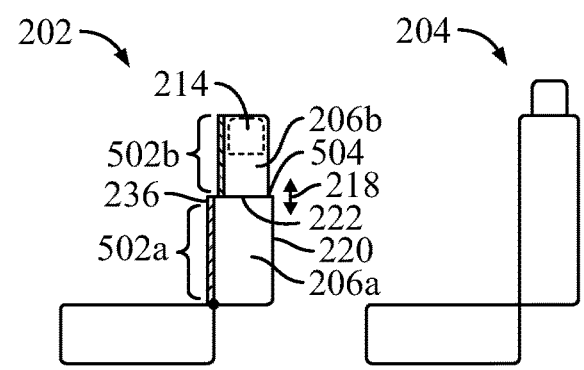
Figure 5C:
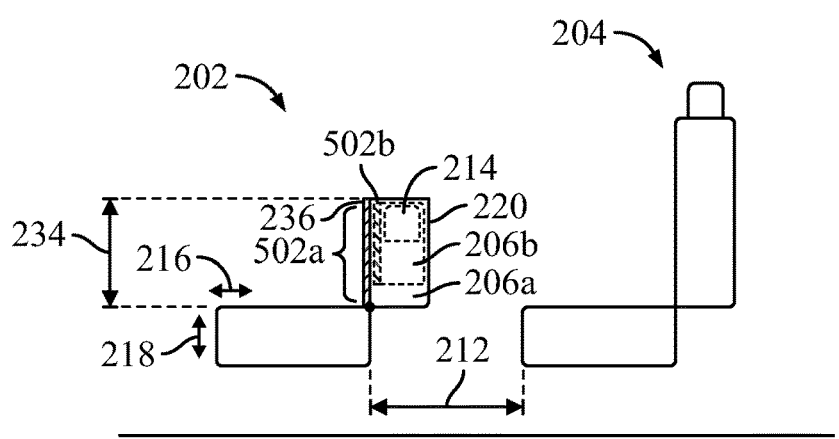

Referring now to FIGS. 5A-C, an alternative embodiment of the seat transformation is shown where the upper modular support 206b is translated horizontally relative to the lower modular support 206a prior to being inserted within the lower modular support 206a. The upper modular support 206b may be thinner/narrower than the lower modular support 206a. This difference in dimensions allows the lower modular support 206a to have spacing within its structure, such as a cavity, for the upper modular support 206b to be inserted inside. The thickness of the lower and upper modular supports 206a, b may be measured as the distance from the supporting surface 236 progressing towards the back surface 220 of the front seat 202.

Although the upper modular support 206b may have a smaller dimensional thickness than the lower modular support 206a, the two components may align along the supporting surface 236 of the front seat 202 to provide a continuous and uninterrupted surface for a user to rest his or her back on. The alignment and difference in thickness between the modular sections may create a modulating gap 504 between the upper modular support 206b and the lower modular support 206a near the back surface 220 of the front seat 202. The modulating gap 504 may lie on the borderline 222 and allow the upper modular support 206b to shift horizontally backwards towards the back surface 220. The supporting surface 236 may also have a cushioning surface 502 along the aligned lower and upper modular supports 206a, b. The cushioning may prevent a user from feeling any discontinuity in the supporting surface 236 that may be created along the borderline 222 between the modular sections. The cushioning surface 502 running along the supporting surface 236 may be in the form of leather or leatherette cushioning. The cushioning surface 502 may be divided into a lower cushioning surface 502a and an upper cushioning surface 502b. The lower cushioning surface 502a may cover the portion of the supporting surface 236 created by the lower modular support 206a. The upper cushioning surface 502b may cover the portion of the supporting surface 236 created by the upper modular support 206b. The lower cushioning surface 502a and the upper cushioning surface 502b may lay flush to each other and create a continuous and uninterrupted supporting surface 236 for a user to lean on without noticing the modularity of the back support 206, specifically along the borderline 222.

As shown in FIG. 5B, the upper cushioning surface 502b and the upper modular support 206b may together shift backwards towards the back surface 220, via horizontal direction 216, and narrow the modulating gap 504. The shift may be necessary since the upper modular section 206b may need to misalign from the edges of the lower modular section 206a (i.e., the edges along the supporting surface 236 and back surface 220) to be able to move downwards inside the lower modular section 206a, as described elsewhere herein. Such misalignment created by the horizontal shift of the upper modular section 206b may be considered as creating a clearance for the upper modular section 206b to move inside the lower modular section 206a. The horizontal shifting of the upper cushioning surface 502b and upper modular support 206b towards the modulating gap 504 may be automated via an electromechanical mechanism or performed manually via a mechanical mechanism.

Figure 5D:
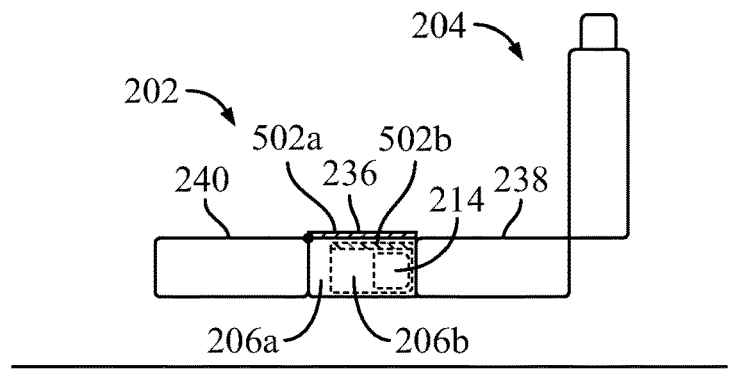

As shown in FIG. 5B, the horizontal shifting of the upper modular support 206b and upper cushioning surface 502b may not fully fill the modulating gap 504 since there may be a need for spacing between the aforementioned components and the rear edge of the lower modular support 206a, near the back surface 220. The upper modular support 206b and the upper cushioning surface 502b may need spacing for clearance from the edges of the lower modular support 206a, specifically along the supporting surface 236 and the back surface 220. Such spacing creating the clearance may ultimately allow the upper modular section 206b to align with a cavity (not shown) of the lower modular section 206a to move downwards and fit inside the cavity, as described elsewhere herein. As shown in FIG. 5C, the upper cushioning surface 502b attached to the upper modular support 206b may also fit inside the lower modular support 206a. As a result, the height of the front seat 202 may change to the desired height 234 (shown in FIG. 5C) for reclining the modular back support 206 to the substantially horizontal position, as seen in FIG. 5D. The front headrest 214 may be altered to achieve the desired height 234 as described elsewhere herein. Alternatively, the front headrest 214 may be transformed similar to how the upper modular support 206b may be transformed, in current FIGS. 5A-D, by shifting backwards and then downwards inside the modular back support 206. The rest of the transformation mechanism of the front seat 202 into a substantially flat and continuous surface with the rear seat 204 may be the same as described elsewhere herein. Although FIG. 5D does not show the supporting surface 236 fully flush with the rear sitting surface 238 and the front sitting surface 240, because of the added lower cushioning surface 502a, such surfaces may nevertheless be fully flush. This may be because rear sitting surface 238 and front sitting surface 240 may have similar cushioning.

Referring now to FIGS. 6A-E, an alternative embodiment of the seat transformation is shown where the upper cushioning surface 502b is retracted within the upper modular support 206b to create spacing for the upper modular support 206b to retract inside the lower modular support 206a. The upper modular support 206b may have a receiving cavity 602 parallel and adjacent to the upper cushioning surface 502b for the upper cushioning surface 502b to retract horizontally inside the cavity, as seen in FIG. 6B. The upper cushioning surface 502b may retract backwards inside the receiving cavity 602 in the horizontal direction 216 to reduce the thickness of the upper modular section 206b. This change in thickness may misalign the upper modular section 206b with the supporting surface 236 edge of the lower modular section 206a. As a result, the thickness of the upper modular support 206b narrows in order to be inserted in the lower modular support 206a, as seen in FIG. 6C. By way of example and not limitation, the upper cushioning surface 502b may be thicker and extend more inward in the modular back support when compared to the lower cushioning surface 502a, as shown in FIG. 6E. This may be because the inner upper thickness 606 of the upper modular support 206b may be narrower than the inner lower thickness 608 of the lower modular support 206a, and the spacing filling up such difference in thickness proximate to the supporting surface 236 may be the upper cushioning surface 502b. Such design may be needed for the operation of the telescoping mechanism that retracts the upper modular support 206b and the upper cushioning 502b inside the lower modular support 206a. The horizontal retraction of the upper cushioning surface 502b inside the upper modular portion 206b may be automated via an electromechanical mechanism or performed manually via a mechanical mechanism.

Referring back to FIG. 6A, an already existing spacing gap 604 near the back surface 220 may be present along the borderline 222 between the lower and upper modular sections 206a, b. This may be because the upper modular section 206b is thinner than the lower modular section 206a. The spacing gap 604 may provide the upper modular section 206b extra room away from the back surface 220 edge of the lower modular section 206a in order to move downwards inside the lower modular section 206a. As a consequence of having spacing and clearance from the edges of the lower modular section 206a, the upper modular support 206b and the upper cushioning surface 502b may retract downward inside the lower modular support 206a, as described elsewhere herein. The front headrest 214 may be adjusted to fit inside the lower modular support 206a as described elsewhere herein, or similarly to how the upper modular support 206b is transformed with reference to FIGS. 5A-D. This transformation would result in achieving the desired seat height 234 for the modular support 206 to recline backwards and lay substantially flush with the rear bottom support 208, as seen in FIG. 6D and described elsewhere herein. As described elsewhere herein, the lower cushioning surface 502a and the upper cushioning surface 502b may also lay flush to each other and create a continuous and uninterrupted supporting surface 236 for a user to lean on without noticing the modularity of the back support 206, specifically along the borderline 22. Although FIG. 6D does not show the supporting surface 236 fully flush with the rear sitting surface 238 and the front sitting surface 240, because of the added lower cushioning surface 502a, such surfaces may nevertheless be fully flush. This may be because rear sitting surface 238 and front sitting surface 240 may have similar cushioning.

Referring now to FIGS. 7A-E, an alternative embodiment of the seat transformation is shown where the front and rear edges of the upper modular support 206b are retracted within it to create spacing for the upper modular support 206b to retract inside the lower modular support 206a. As shown in FIG. 7A, the front edge 702a of the upper modular section 206b may be modular and also part of the supporting surface 236. The rear edge 702b of the upper modular section 206b may also be modular and part of the back surface 220. The front edge 702a may be considered as the upper cushioning surface 702a that may lay flush to the first lower cushioning surface 706a to create a continuous and uninterrupted supporting surface 236 for a user to lean on without noticing the modularity of the back support 206, specifically along the borderline 22. The rear edge 702b may also be considered as a second upper cushioning surface 702b that may lay flush with the second lower cushioning surface 706b along the back surface 220. The second upper cushioning surface 702b and the second lower cushioning surface 706b may also create a continuous and uninterrupted back surface 220. There may exist a front receiving cavity 704a parallel and adjacent to the front upper cushioning surface 702a. There may exist a rear receiving cavity 704b parallel and adjacent to the rear upper cushioning surface 702b. As shown in FIG. 7B, the front and rear upper cushioning surfaces 702a, b may horizontally translate inside the front and rear receiving cavities 704a, b, respectively, to reduce the thickness of the upper modular section 206b relative to the lower modular section 206a. As a result, the edges along the supporting surface 236 and back surface 220 of the lower modular support 206a and the upper modular support 206b misalign to create a spacing and clearance for the upper section 206b to move downwards in the vertical direction 218 inside the lower section 206a, as seen in FIG. 7C and discussed elsewhere herein. The front headrest 214 may be adjusted to fit inside the lower modular support 206a as described elsewhere herein, or similarly to how the upper modular support 206b is transformed with reference to FIGS. 7A-E. This transformation would result in achieving the desired seat height 234 for the modular support 206 to recline backwards and lay substantially flush with the rear bottom support 208, as seen in FIG. 7D and described elsewhere herein. Although FIG. 7D does not show the supporting surface 236 fully flush with the rear sitting surface 238 and the front sitting surface 240, because of the added lower cushioning surface 706a, such surfaces may nevertheless be fully flush. This may be because rear sitting surface 238 and front sitting surface 240 may have similar cushioning.

By way of example and not limitation, the cushioning of the front and rear edges 702a, b may be thicker and extend more inward in the modular back support when compared to the first and second lower cushioning surfaces 706a, b, as shown in FIG. 7E. This may be because the internal upper thickness 710 of the upper modular support 206b may be narrower than the internal lower thickness 708 of the lower modular support 206a, and the spacing filling up such difference in thickness proximate to the supporting surface 236 and the back surface 220 may be the cushioning of the front and rear edges 702a, b. Such design may be needed for the operation of the telescoping mechanism that retracts the upper modular support 206b and the upper cushioning 502b inside the lower modular support 206a.

Figure 8A:
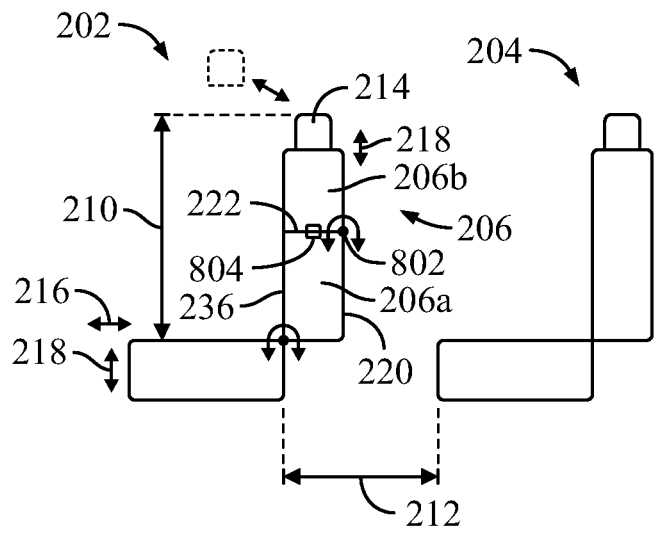
FIGS. 8A-C are side view diagrams of another embodiment where the front seat transforms into a substantially flat position.
Figure 8B:
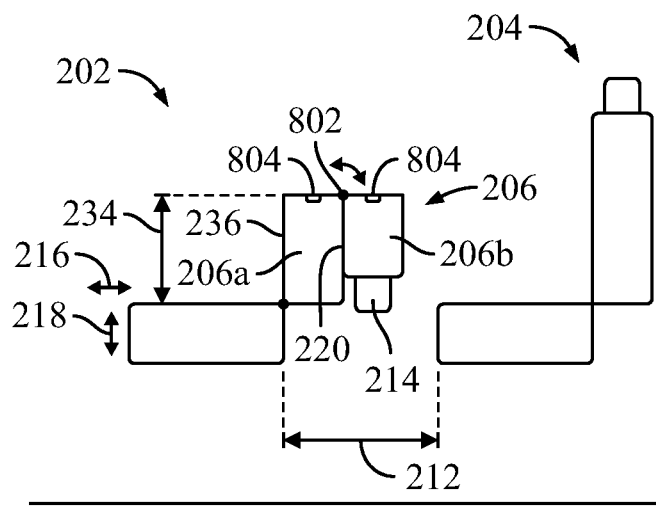
Figure 8C:
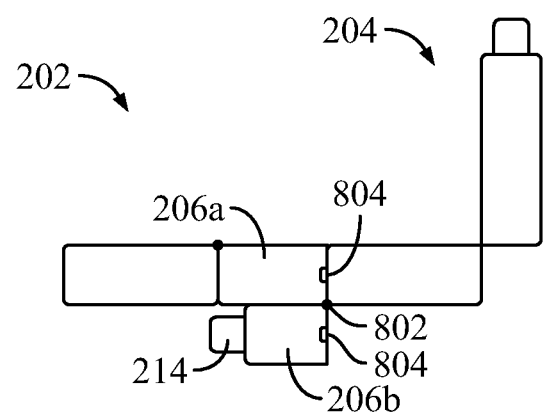

Referring now to FIGS. 8A-C, an alternative embodiment of the seat transformation is shown where the upper modular support 206b is pivotable relative to the lower modular support 206a. A second pivoting mechanism 802 may have an axis of rotation parallel to the width of the front seat 202 and located at the end of the borderline 222 nearest to the back surface 220. By way of example and not limitation, the pivoting mechanism may be one or more hinges. A locking mechanism 804 may be in between the lower and upper modular supports 206a, b along the borderline 222 that lock the modular components together. By way of example and not limitation, the locking mechanism 804 may be approximately in the middle of the borderline 222 or near the supporting surface 236. By way of example and not limitation, the locking mechanism 804 may be in the form of a latching mechanism. By way of example and not limitation, multiple locking mechanisms may be distributed along the borderline 222 of the lower and upper modular supports 206a, b to provide more safety from unwanted disengagement. The front headrest 214 may be manually removable or may fit inside the upper modular support 206b, as described elsewhere herein To transform the front seat 202, the front headrest 214 may be removed, translated inside the upper modular support 206b, or may stay in its original position, as shown in FIG. 8B. The locking mechanism 804 may then disengage to allow the lower and upper modular supports 206a, b to separate from each other. The upper modular support 206b may rotate about the pivot axis of the second pivoting mechanism 804 from its original position to a position that would shorten the height of the front seat 202. The original position of the upper modular support 206b may be on top and aligning with the lower modular support 206a. By way of example and not limitation, the upper modular support 206b may rotate 180 degrees clockwise about the second pivoting axis 802 so that the back surface 220 portion of the upper modular support 206b contacts the back surface 220 portion of the lower modular support 206a. There may exist a binding mechanism on the back surface 220 to keep the folded upper modular support 206b interlocked with the lower modular support 206a. As shown in FIG. 8C, such transformation of the front seat 202 may reduce the seat height for the back support 206 to recline and fit within the gap distance 212 and create a substantially flat surface, as described elsewhere herein. The usage of the locking mechanism 804 and the second pivoting mechanism 804 may be automated or done manually. The rest of the transformation mechanism of the front seat 202 into a substantially flat and continuous surface with the rear seat 204 may be the same as described elsewhere herein.

Figure 9A:
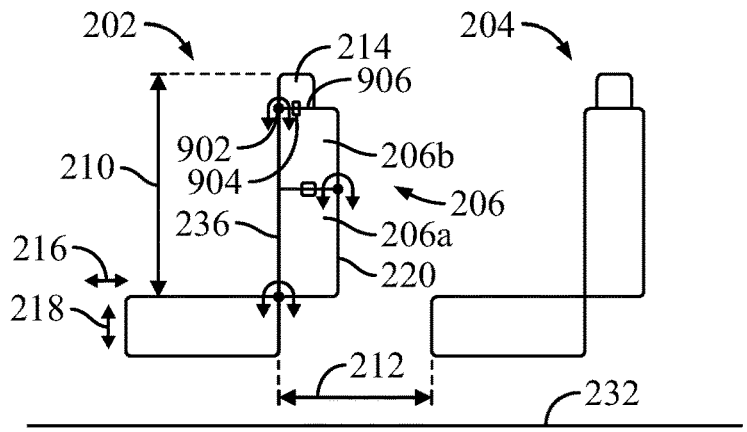
FIGS. 9A-D are side view diagrams of another embodiment where the front seat transforms into a substantially flat position.
Figure 9B:
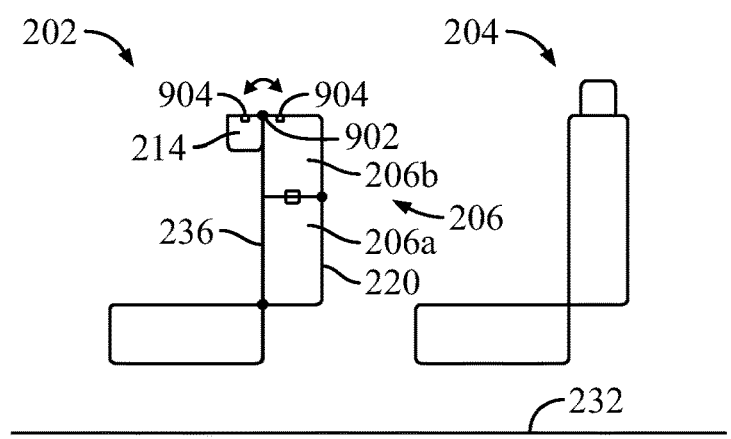
Figure 9C:
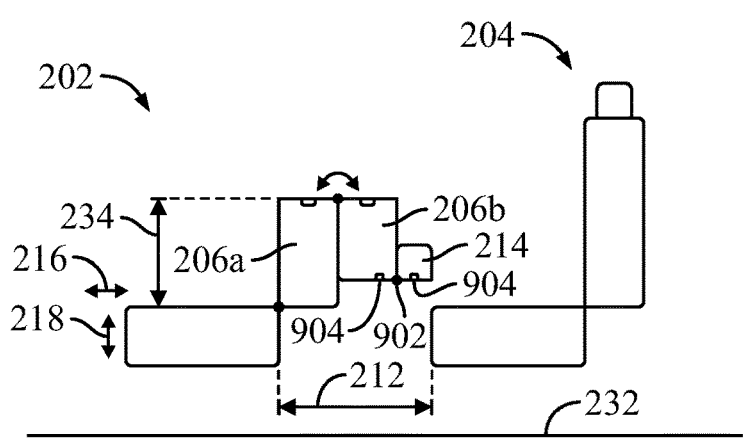
Figure 9D:
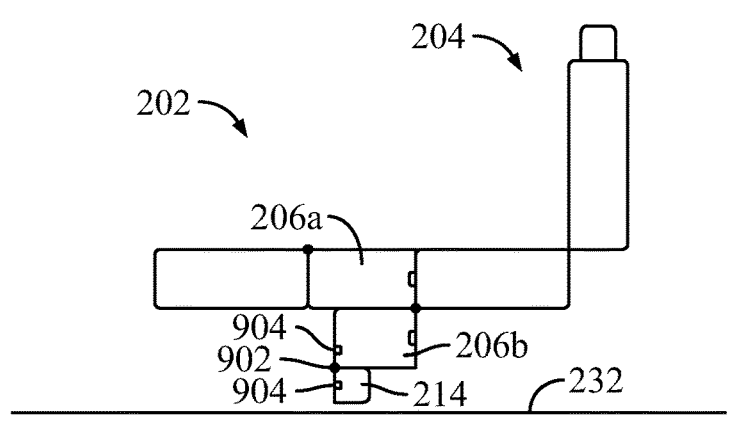

Referring now to FIGS. 9A-D, an alternative embodiment of the seat transformation is shown where the front headrest 214 is pivotable relative to the upper modular support 206b. A third pivoting mechanism 902 may have an axis of rotation parallel to the width of the front headrest 214 and located at the end of a second borderline 906 between the headrest 214 and the upper modular section 206b, the end being nearest to the supporting surface 236. By way of example and not limitation, the third pivoting mechanism may be one or more hinges. A second locking mechanism 904 may be in between the headrest 214 and the upper modular supports 206b along the second borderline 906 that lock such modular components together. As seen in FIG. 9B, the second locking mechanism 904 may be unlocked so that the headrest 214 can pivot about the pivot axis of the third pivoting mechanism 902 by approximately 180 degrees towards the supporting surface 236 and shorten the height of the front seat 202. There may exist a binding mechanism on the support surface 236 to interlock the pivoted headrest 214 with the supporting surface 236. The rest of the seat transformation of the front seat 202 to the reclined and substantially flat position may be the same as to what has been described with reference to FIGS. 8A-C. The front seat 202 may have to be raised in the vertical direction 218 relative to the interior floor 232 and move away horizontally 216 from the rear seat 204 to create more room for the folded headrest 214 to fit within the gap distance 212.

Figure 10A:
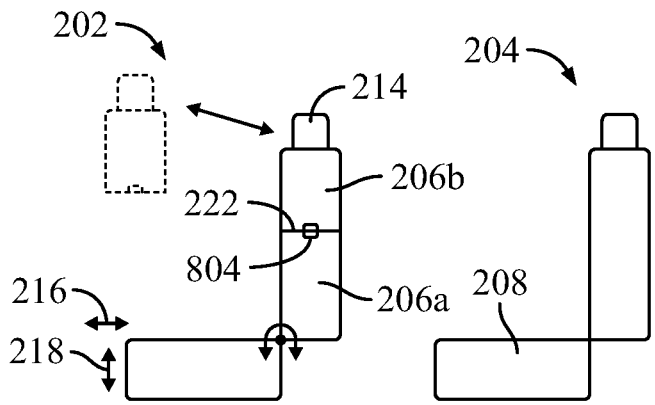
FIGS. 10A-B are side view diagrams of another embodiment where the front seat transforms into a substantially flat position.
Figure 10B:
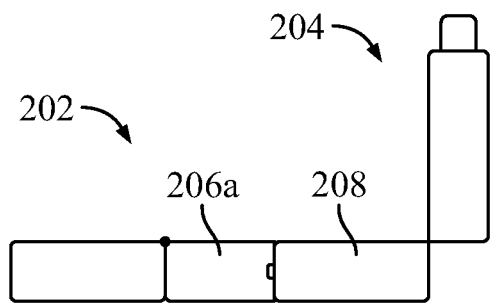

Referring now to FIGS. 10A-B, an alternative embodiment of the seat transformation is shown where the upper modular support 206b is completely removable from the lower modular support 206a, along with the front headrest 214. The upper modular support 206b may be completely removable from the lower modular support 206a, when the locking mechanism 804 that keeps the two modular components securely coupled to each other is unlocked by the user. The locking mechanism 804 may be similar as to what has been described elsewhere herein and may be located along the borderline 222 between the lower and upper modular supports 206a, b. The removal of the upper modular support 206b may result in achieving the desired seat height for the modular support 206 to recline backwards and lay substantially flush with the rear bottom support 208, as seen in FIG. 10B and described elsewhere herein. The rest of the transformation mechanism of the front seat 202 into a substantially flat and continuous surface with the rear seat 204 may be the same as described elsewhere herein.

The components and methods disclosed so far herein to transform the front seat 202 into a substantially flat and continuous surface with the rear seat 204 is not limited to the seats of cars and motor vehicles. The components and methods disclosed herein may also be used to transform the seats of other modes of transportation, such as a truck, bus, airplane, train, and ship seats. By way of example and not limitation, FIGS. 11A-C show the seat transformation apparatus and mechanisms disclosed herein used in an airplane cabin that may be used for leg stretching and better restful positions. As seen in FIG. 11B, multiple modular seats 202 that are in-line with each other in the airplane cabin may be transformed into flat, continuous, and flush positions, using the mechanisms disclosed herein, to give the airplane passenger more room to comfortably lie in the airplane cabin. As seen in FIG. 11C, a recliner 1102 and curtain 1104 may be used with the transformation of the modular seat 202 to help create a more comfortable space for the airplane passenger to lie on. What will be disclosed further herein may also apply to the aforementioned alternate modes of transportation.

Referring now to FIG. 12, a perspective view of an interior of the vehicle 1200 transformed in a substantially flat and continuous sleeping area is shown. The two front seats of the vehicle 202a, b may be transformed into a substantially flat surface adjoining the rear bottom supports 208a, b of the side rear seats 204a, b, as describe elsewhere herein. By way of example and not limitation, such transformation may be done by the front headrests 214a, b and upper modular supports 206*b*, *d* of the front seats 202*a*, *b* translating inside the lower modular supports 206*a*, *c*, as describe elsewhere herein. However, other seat transformation mechanisms described elsewhere herein may also be used. The horizontal and vertical positions of front seats 202*a*, *b* may also be adjusted for the back supports of the front seats 202*a*, *b* to recline backwards to create a substantially flat, continuous, and flush surface among the front sitting surfaces 240*a*, *b*, the supporting surfaces 236*a*, *b*, and the rear sitting surfaces 238*a*, *b*, as described elsewhere herein. This transformation may allow the users to lie flat and sleep in the horizontal interior direction 1212 that runs along the length of the vehicle from the front to the rear seats. By way of example and not limitation, the contours of the front sitting surfaces 240*a*, *b*, the supporting surfaces 236*a*, *b*, and the rear sitting surfaces 238*a*, *b* may also transform from their original curved form to a flatter plane, as shown in FIG. 12, using a pneumatic and mechanical systems under the aforementioned surfaces.

The other parts of the interior vehicle 1200 may also be modified to create a more flat and spacious space for the user to sleep on, especially in the diagonal direction 1208 of the interior vehicle 1200. For example, the middle section 1202 between the two front seats 202*a*, *b* may be adjusted to become more flat and flush with the front seats. By way of example and not limitation, the stick-shift 1210 of the vehicle may be detached to create a flatter section in the middle section 1202. The newer vehicles, especially electric vehicles, do not have a stick-shift, and so the middle section 1202 may already be flat at such section. The cup-holders (not shown) may also be covered, such as by a flat cushion, to make the middle section 1202 more flat.

As described elsewhere herein, the armrest 1214 may be adjusted to be on the same height level as the other components, for example the lower modular supports 206*a*, *c*, to create a substantially flat, continuous, and flush surface for a user to sleep in the diagonal direction 1208. The armrest 1214 may be modified to be on the same height level as the other described components and also fill and cover the middle gap 1206 between the armrest 1214 and the middle bottom support 1216 of the rear middle seat 1204, as described elsewhere herein. The middle gap 1206 may be defined as the leg space in front of the rear middle seat 1204. Other modes and methods to fill the middle gap 1206 is also contemplated elsewhere herein.

If the middle leg space 1206 is filled and covered, and the armrest 1214 becomes flush with the flattened front seats 202*a*, *b*, then the one or more users of the vehicle may lie diagonally 1208 inside the interior vehicle 1200. The diagonal direction 1208 may span from the front corner edge of a front bottom support 226*a*, *b* to the rear corner edge of a rear bottom support 208*a*, *b*, on the opposite side of the vehicle. For example, when facing the steering wheel 246 inside the vehicle, the diagonal direction 1208 may span from the front-right corner edge of the bottom support 226*b*, at the front passenger side, to the rear-left corner edge of the bottom support 208*a* behind the driver seat, as shown in FIG. 12. The diagonal direction 1208 may provide more spacing for a user to lie when compared to the interior horizontal direction 1212. This is because the interior of the vehicle 1200 is usually approximately rectangular, and the diagonal of a rectangle is greater in length than its sides.

Figure 13:
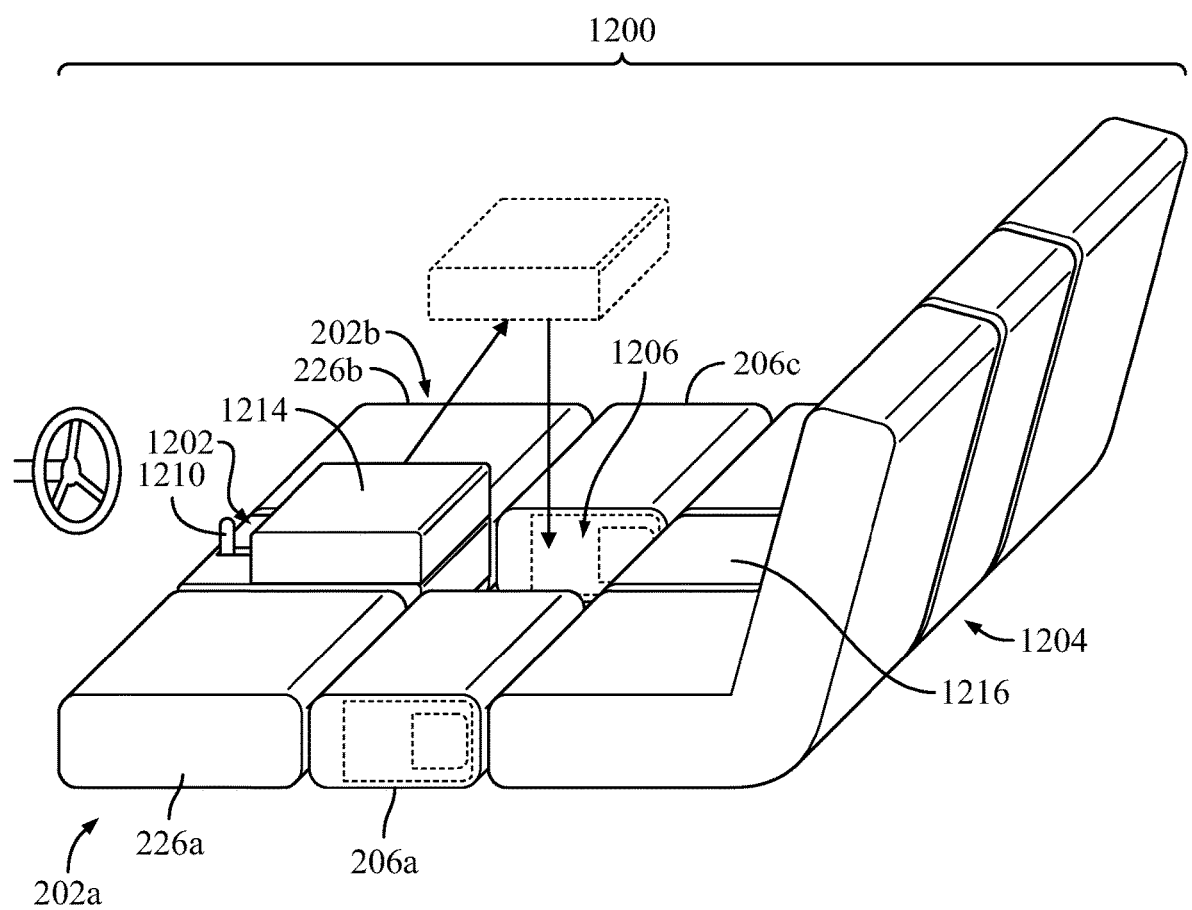
FIG. 13 is a perspective view of the interior of the vehicle with the armrest of the vehicle filling a mid-section gap.

Referring now to FIG. 13, a perspective view of the interior vehicle 1200 with the armrest 1214 being detached and placed within the mid-section gap 1206 is shown. The armrest 1214 may be the support surface on, or a part of, the center console 1402 (see FIG. 14A) of a vehicle. Such component may be near the stick-shift 1210 and elevated for a user to rest his or her arms on. As seen in FIG. 13, the armrest 1214 may simply be detached from the center console 1402 and be placed in the mid-section gap 1214 to cove and fill such gap. As a result, the middle section 1202 of the vehicle becomes more substantially flat, continuous, and flush with the front and rear seats, including the front bottom supports 226*a*, *b* and the lower modular supports 206*a*, *c*. This is because the mid-section gap 1206 is filled and covered, and the armrest 1214 is on an even level with the seats of the vehicle, as shown in FIG. 13. The one or more users of the vehicle may then fully lie diagonally or horizontally in the interior vehicle 1200.

Figure 14A:
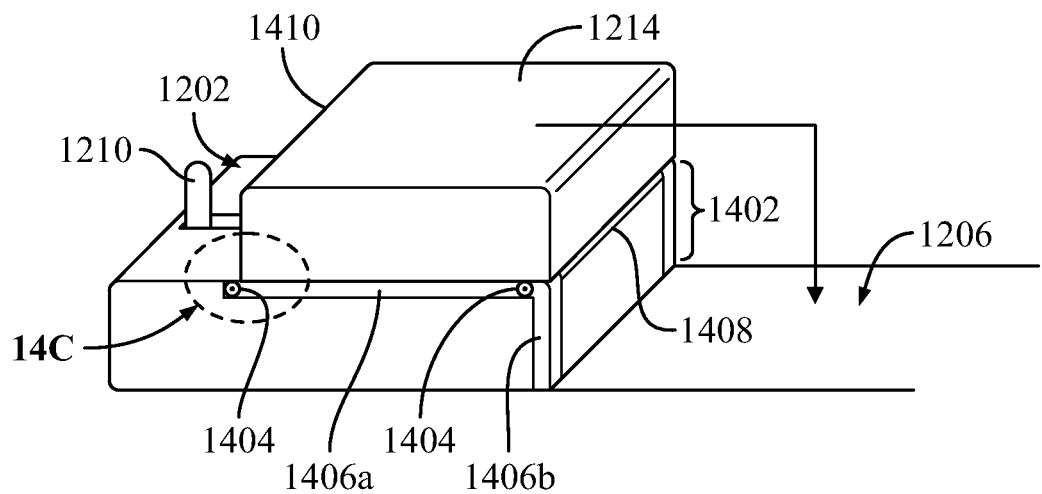
FIGS. 14A-C show one embodiment of how the armrest may move and fill the mid-section gap.
Figure 14B:
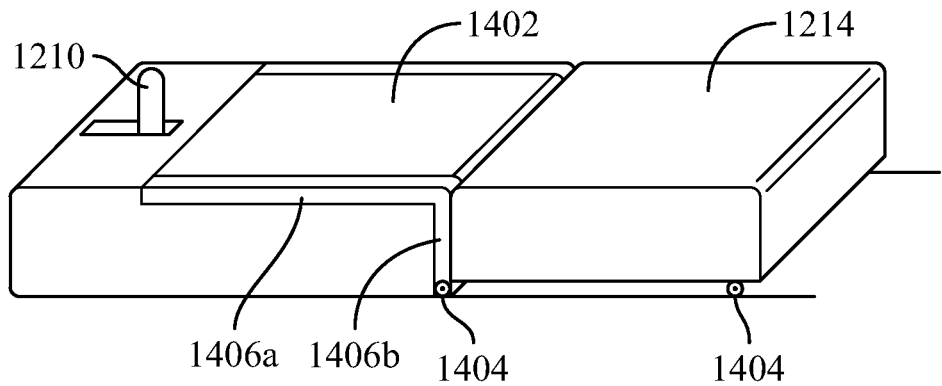
Figure 14C:
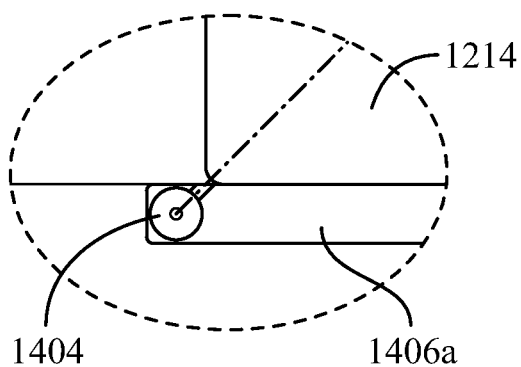

Referring now to FIGS. 14A-C, an embodiment of the armrest 1214 sliding inside the mid-section gap 1206 via railings 1406*a*, *b* to create a substantially flat surface is shown. As seen in FIG. 14A, the armrest 1214 may initially be on the center console 1402 and near the stick-shift 1210. The bottom side edges of the armrest 1214 that are substantially parallel to the sitting surfaces 240*a*, *b* of the front seats 202*a*, *b* (shown in FIG. 12) may be slidably coupled to horizontal and vertical railings 1406*a*, *b* on the center console 1402. The horizontal railings 1406*a* may extend from the region near the front end 1410 of the armrest 1214 facing the stick-shift 1210, to the rear edge 1408 of the center console 1402, which is adjacent to the mid-section gap 1206. The rear edge of the armrest 1214 may also be located adjacent to the mid-section gap 1206. By way of example and not limitation, the horizontal railings 1406*a* may extend past the front end 1410 of the armrest 1214 and towards the stick-shift 1210. The vertical railings 1406*b* may be connected to the horizontal railings 1406*a* at the rear edge 1408 of the center console 1402 and extend downwards in the depth of the mid-section gap 1206. As a result, the armrest 1214 may slide horizontally towards the mid-section gap 1206 and slide downwards within the depth of such gap, as seen in FIG. 14B. The armrest 1214 may not necessarily have to translate all the way down to the bottom depth of the mid-section gap 1206. Through such transitioning, the middle section 1202 between the two front seats 202*a*, *b* (shown in FIG. 12) may become more flat and flush with the vehicle seats. As shown in FIGS. 14A-C, wheels or bearings 1404 may be attached to the bottom side edges of the armrest 1214. The wheels 1404 may be coupled to the railings 1406*a*, *b* to help in transitioning the armrest 1214 in the desired position. The sliding of the armrest 1214 via the railings 1406*a*, *b* may be automated or done manually, similar to the other translation mechanisms described elsewhere herein. As shown in FIG. 14C, the wheels 1404 connected to the front end 1410 of the armrest 1214 may be situated in the horizontal railings 1406*a* more outwards relative to the front end 1410 of the armrest 1214 and also be angled to help the armrest 1214 lay flush and create the substantially flat surface in the middle section 1202. By way of example and not limitation, the angel between the front wheels 1404 and the armrest 1214 may be 40 to 50 degrees. Additionally, a latch and handle could be included to secure the armrest 1214 in place for both the initial position and position where the armrest 1214 is within the mid-section gap 1206.

Figure 15:
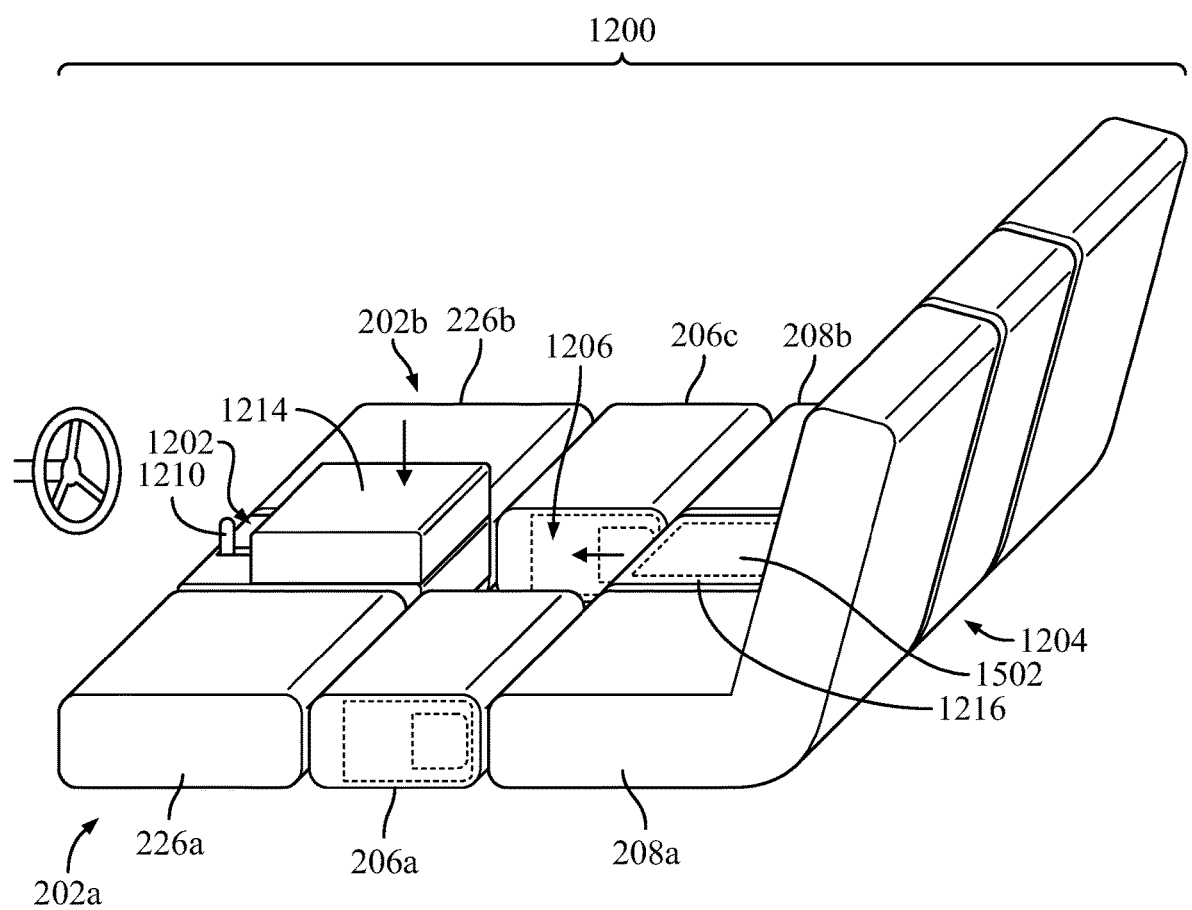
FIG. 15 shows another embodiment of the mid-section gap being covered and filled.

Referring now to FIG. 15, another embodiment of how the mid-section gap 1206 may be filled to create the substantially flat surface is shown. The middle bottom support 1216 of the rear middle seat 1204 may have a storage area for a cushioning1502. The cushioning1502 may be used to fill and cover the mid-section gap 1206. The cushioning1502 may slide horizontally out from under the middle bottom support 1216 and towards the mid-section gap 1206. This would result in making the middle section 1202 of the interior vehicle 1200 more flat and flush with the seats of the vehicle. By way of example and not limitations, the cushioning1502 may be rectangular in shape. Additionally, the armrest 1214 may be configured to translate vertically downwards within a cavity (not shown) of the center console 1402 (shown in FIG. 14A) to lay flush with the cushioning1502 and further flatten the middle section 1202. By way of example and not limitation, the armrest 1214 may be modular in order to shift inside the center console 1402. The shifting of the armrest 1214 vertically downwards inside a cavity of the center console 1402 may be automated or done manually, similar to the other translation mechanisms described elsewhere herein. Alternatively, the armrest 1214 may simply be detached, as seen in FIG. 13, in order for the center console 1402 (shown in FIG. 14) to lay flush to the cushioning1502 that is withdrawn from the middle bottom support 1216.

Figure 16:
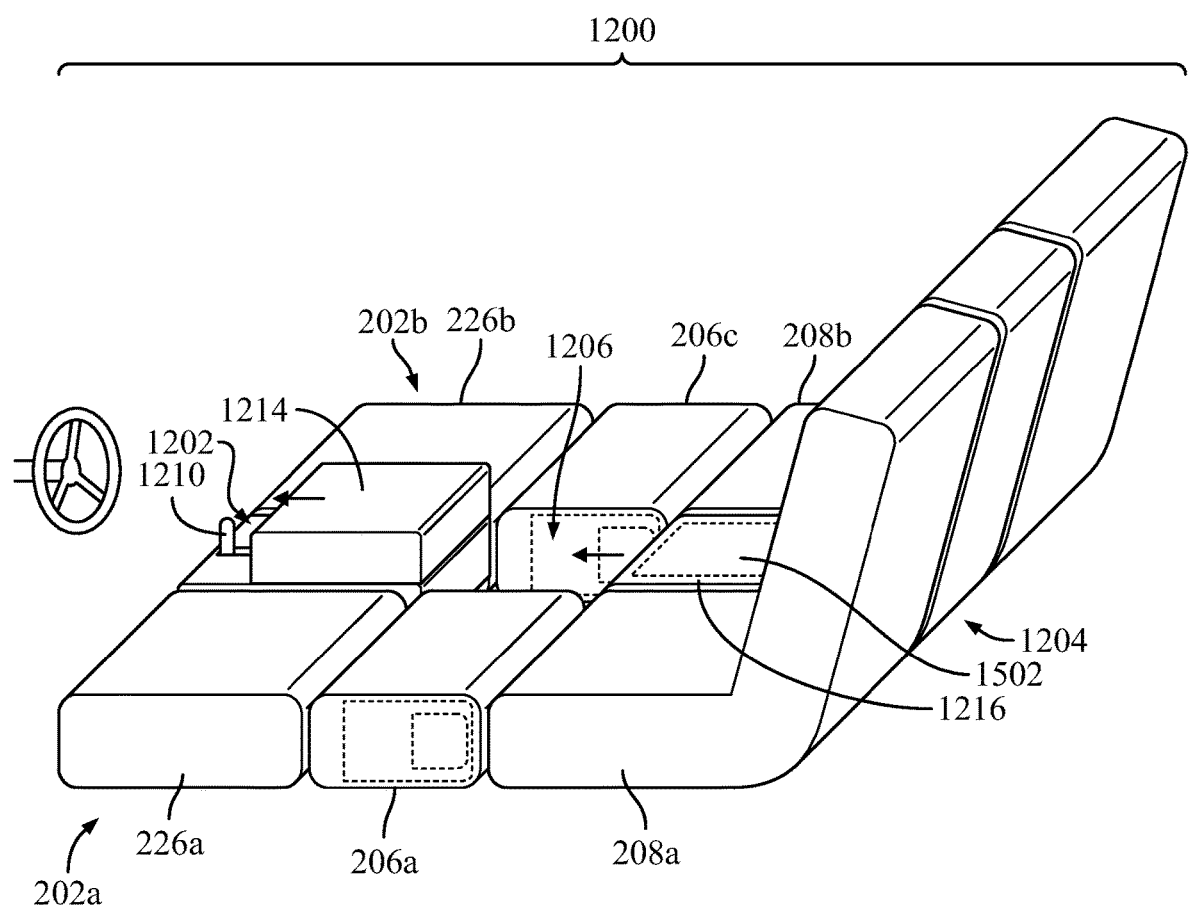
FIG. 16 shows another embodiment of the mid-section gap being covered and filled.

Referring now to FIG. 16, another embodiment similar to FIG. 15 is disclosed where instead of the armrest 1214 being translated vertically downwards inside the cavity, the armrest 1214 shifts horizontally towards the stick-shift 1210. The armrest 1214 is translated towards the stick-shift 1210 to create a substantially flat area in that section. The stick-shift 1210 may be removed for the armrest 1214 to be placed substantially flat and flush with the front bottom supports 226a, b in that section, or the armrest 1214 may translate and cover the stick-shift 1210, if not removed. Alternatively, the armrest 1214 may shift horizontally towards the stick-shift section and then translate vertically downwards to create the substantially flat and flush mid-section surface with the front bottom supports 226a, b. The mid-section gap 1206 may be filled and covered by the cushioning 1502 similar to what was described in FIG. 15.

FIG. 17 is a perspective view of the rear seats of a vehicle having a storage area for sleeping accessories. The side rear seats 204a, b and the middle seat 1204 may each have a storage area 1704 for sleeping accessories, such as blankets, pillows, and other beddings, behind the cushioning surfaces of the rear back supports 230a, b, c. By way of example and not limitation, the storage areas 1704 and the sleeping accessories may be accessed by unzipping the zippers 1702 on each cushioning surfaces of the rear back supports 230a, b, c.

Referring now to FIG. 18, a perspective view of the substantially flat, continuous, and spacious sleeping area of the vehicle having surfaces with additional features is shown. Aside from the interior vehicle 1200 becoming substantially flat to allow one or more users to sleep in it, the substantially flat surfaces may have heating, cooling, and massaging features. By way of example and not limitation, the seats of the vehicle, along with the armrest 1214 or cushioning1502 (shown in FIG. 15), may have a heating and cooling feature. By way of example and not limitation, the seats of the vehicle, along with the armrest 1214 or cushioning1502, may have a massaging feature. The massaging feature may be in the form of outputting vibrations on the surfaces of the seats and armrest. The heating and cooling feature and the massaging feature may be used simultaneously. As shown in FIG. 17, only some of the surfaces may be activated to provide heating, cooling, and massaging. By way of example and not limitation, such features may only be activated on the front passenger bottom support 226b, the armrest 1214 placed within the mid-section gap 1206, and the rear bottom support 208a behind the driver seat. The user may select other combinations of surfaces, describe elsewhere herein, to provide heating, cooling, and massaging.

Referring now to FIG. 19, a perspective view of the substantially flat, continuous, and spacious interior area of the vehicle having room to store objects is shown. Aside from the created flat area in the interior vehicle 1200 being used for sleeping, such area may also be used to store and transport large objects that would normally not fit inside the trunk of the vehicle. A hanger 1902 attached to the interior of the vehicle may be used to help store and transport such large objects. With the exception of the front driver seat 202a, the rest of the interior vehicle 1200 may become substantially flat relative to each other, through the components and mechanisms described elsewhere herein, to store objects and transport them to different destinations.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for transforming an interior of a vehicle into a sleeping space, the system comprising:
a plurality of back seats having a first back seat and a second back seat;
a front passenger seat being in front of the first back seat and having a first modular back support pivotably attached to a first bottom support;
the first modular back support having a first upper modular section and a first lower modular section with a first cavity configured for the first upper modular section to fully retract inside the first cavity to reduce a first initial height of the first modular back support to a first desired height;
a driver seat being in front of the second back seat and having a second modular back support pivotably attached to a second bottom support;
the second modular back support having a second upper modular section and a second lower modular section with a second cavity configured for the second upper modular section to fully retract inside the second cavity to reduce a second initial height of the second modular back support to a second desired height; and
wherein the first modular back support having the first desired height is configured to recline in a first horizontal position so that a first supporting surface of the first modular back support is flush relative to a first sitting surface of the first back seat;
wherein the second modular back support having the second desired height is configured to recline in a second horizontal position so that a second supporting surface of the second modular back support is flush relative to a second sitting surface of the second back seat.

2. The system of claim 1, wherein the first upper modular section is configured to telescopically retract into the first lower modular section.

3. The system of claim 1, wherein the first upper modular section is configured to shift backwards relative to the first lower modular section prior to retracting inside the first cavity.

4. The system of claim 1, wherein the front passenger seat further comprises a headrest attached on top of the first modular back support that retracts inside the first upper modular section.

5. The system of claim 1, wherein the front passenger seat further comprises a front headrest removably attached on top of the first modular back support.

6. The system of claim 1, wherein the first modular back support further comprises an intermediate modular section between the first upper modular section and the first lower modular section, the intermediate modular section configured to fully retract inside the first cavity of the first upper modular section.

7. The system of claim 1, further comprising an armrest on a middle section of the vehicle and configured to be translated within a middle leg spacing gap in front of a middle back seat.

8. The system of claim 7, wherein the armrest is configured to be translated within the middle leg spacing gap via a plurality of railings.

9. The system of claim 8, wherein the armrest has a plurality of wheels coupled to the plurality of railings.

10. The system of claim 7, wherein the armrest is configured to be detached from the middle section and be placed within the middle leg spacing gap.

11. The system of claim 7, wherein the middle back seat comprises a middle back support having a storage area for sleeping accessories.

12. The system of claim 3, wherein the first upper modular section is configured to shift backward within a modulating gap on a borderline between the first upper modular section and the first lower modular section.

13. The system of claim 2, wherein the first upper modular section and the first lower modular section have a cooperative telescoping mechanism which is electromechanically actuated.

14. A method for transforming seats of a vehicle into a sleeping space, the method comprising:

retracting an upper modular section inside a cavity of a lower modular section of a modular back support of a front passenger seat to transform the modular back support from an initial height to a desired height;

widening a gap distance between the front passenger seat and a rear passenger seat so that the gap distance is greater than or equal to the desired height of the modular back support; and reclining the modular back support horizontally about a pivot axis between the modular back support and a first bottom support of the front passenger seat so that a supporting surface of the modular back support is flush relative to a sitting surface of a second bottom support of the rear passenger seat.

15. The method of claim 14, wherein the retracting of the upper modular section into the lower modular section is performed telescopically.

16. The method of claim 14, further comprising retracting a headrest of the front passenger seat inside the upper modular section to transform the modular back support to the desired height.

17. The method of claim 14, wherein the upper modular section shifts backwards relative to the lower modular section prior to retracting inside the cavity.

18. The method of claim 14, further comprising moving the reclined modular back support horizontally towards the second bottom support when the gap distance is greater than the desired height to create a continuous surface between the supporting surface and the sitting surface.

19. The method of claim 14, further comprising raising a height of the first bottom support so that a front sitting surface of the first bottom support is flush with the supporting surface of the reclined modular back support and with the sitting surface of the second bottom support.

20. The method of claim 14, further comprising removing a front headrest of the front passenger seat to transform the modular back support to the desired height.

\* \* \* \* \*